(12) United States Patent
Kim et al.

(10) Patent No.: US 11,039,104 B2
(45) Date of Patent: Jun. 15, 2021

(54) APPARATUS AND METHOD TO TRANSMIT DATA BY EXTRACTING DATA IN SHOP FLOOR IMAGE, APPARATUS AND METHOD TO RECEIVE DATA EXTRACTED IN SHOP FLOOR IMAGE, AND SYSTEM TO TRANSMIT AND RECEIVE DATA EXTRACTED IN SHOP FLOOR IMAGE

(71) Applicant: N3N CO., LTD., Seoul (KR)

(72) Inventors: Dae Hee Kim, Seoul (KR); Dong Min Seo, Yongin-si (KR); Hye Yong Oh, Seoul (KR); Gwan Hun Pi, Seoul (KR)

(73) Assignee: N3N CO., LTD., Seoul (KR)

( * ) Notice: Subject to any disclaimer, the term of this patent is extended or adjusted under 35 U.S.C. 154(b) by 0 days.

(21) Appl. No.: 16/386,268

(22) Filed: Apr. 17, 2019

(65) Prior Publication Data

US 2019/0327444 A1    Oct. 24, 2019

(30) Foreign Application Priority Data

Apr. 18, 2018 (KR) .................... 10-2018-0045135
Oct. 26, 2018 (KR) .................... 10-2018-0128940

(51) Int. Cl.
*H04N 7/08* (2006.01)
*H04N 7/12* (2006.01)
(Continued)

(52) U.S. Cl.
CPC .............. *H04N 7/08* (2013.01); *G05B 19/05* (2013.01); *G06K 9/00744* (2013.01);
(Continued)

(58) Field of Classification Search
None
See application file for complete search history.

(56) References Cited

U.S. PATENT DOCUMENTS 7,568,019 B1 *   7/2009   Bhargava ............... G06Q 10/06
                                                            709/223
8,169,482 B2 *   5/2012   Kajita .............. G08B 13/19676
                                                            348/159
(Continued)

FOREIGN PATENT DOCUMENTS

JP    2010-271758 A    12/2010
JP    2011-081715 A     4/2011
(Continued)

*Primary Examiner* — Talha M Nawaz
(74) *Attorney, Agent, or Firm* — INVENSTONE Patent, LLC

(57) ABSTRACT

One aspect of the present disclosure provides a device for extracting and transmitting data from a shop floor image, the device comprising: an encoder configured for receiving, from a facility operating system, streaming video data of a display screen of a monitor of the facility operating system on a shop floor, and for encoding the streaming video data in real time; a video data analyzer configured for receiving the real-time encoded streaming video data and for extracting data by figuring out and tagging a data presentation location in the real-time encoded streaming video data using a video data analysis algorithm; and a communication unit configured for transmitting to a data engine the real-time encoded streaming video data, and the data extracted by the video data analyzer.

18 Claims, 13 Drawing Sheets

(51) Int. Cl.
*G06K 9/00* (2006.01)
*H04N 7/01* (2006.01)
*H04N 5/765* (2006.01)
*H04N 5/04* (2006.01)
*H04L 29/06* (2006.01)
*G05B 19/05* (2006.01)
*H04N 17/06* (2006.01)

(52) U.S. Cl.
CPC ............ *H04L 65/607* (2013.01); *H04N 5/04* (2013.01); *H04N 5/765* (2013.01); *H04N 7/0117* (2013.01); *H04N 7/12* (2013.01); *H04N 17/06* (2013.01); *G05B 2219/24215* (2013.01); *G06K 2209/01* (2013.01); *G06K 2209/19* (2013.01)

(56) References Cited

U.S. PATENT DOCUMENTS

| | | | | |
|---|---|---|---|---|
| 9,462,028 | B1* | 10/2016 | Levinson | H04N 21/25841 |
| 2006/0085534 | A1* | 4/2006 | Ralston | H04N 5/76 |
| | | | | 709/223 |
| 2016/0188279 | A1* | 6/2016 | Rajamani | G09G 5/14 |
| | | | | 345/2.3 |
| 2016/0191961 | A1* | 6/2016 | Fisher | H04N 21/234309 |
| | | | | 725/116 |
| 2016/0192009 | A1* | 6/2016 | Sugio | G06K 9/3241 |
| | | | | 725/32 |
| 2016/0219281 | A1* | 7/2016 | Yoshikawa | H04N 19/167 |
| 2017/0127081 | A1* | 5/2017 | Yoshikawa | H04N 19/105 |

FOREIGN PATENT DOCUMENTS

| | | |
|---|---|---|
| KR | 10-2010-0025941 A | 3/2010 |
| KR | 1020100025941 A | 3/2010 |
| KR | 10-1499502 B1 | 3/2015 |
| KR | 101499502 B1 | 3/2015 |
| KR | 10-1655706 B1 | 9/2016 |
| KR | 101655706 B1 | 9/2016 |
| KR | 10-1729725 B1 | 4/2017 |
| KR | 101729725 B1 | 4/2017 |
| KR | 10-2017-0094975 A | 8/2017 |
| KR | 1020170094975 A | 8/2017 |

* cited by examiner

FIG. 7
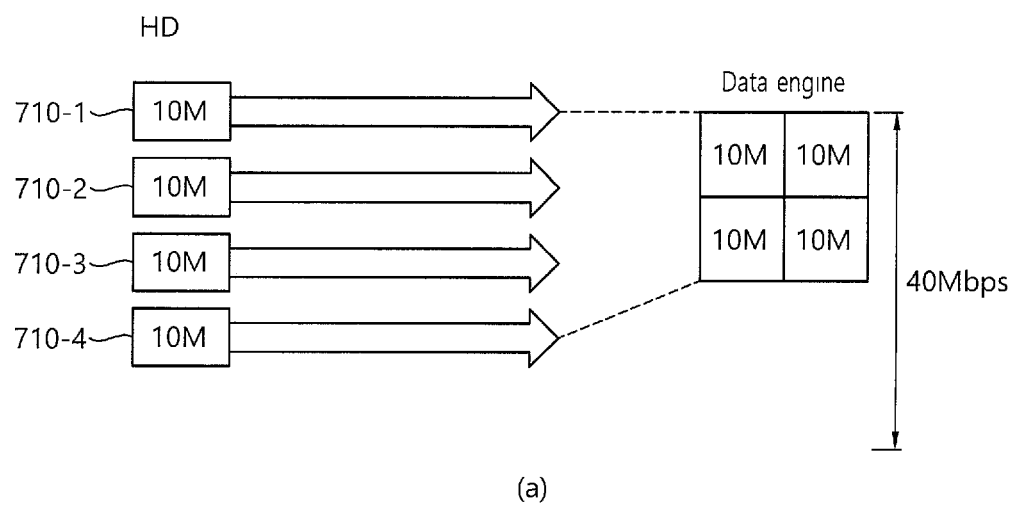
(a)
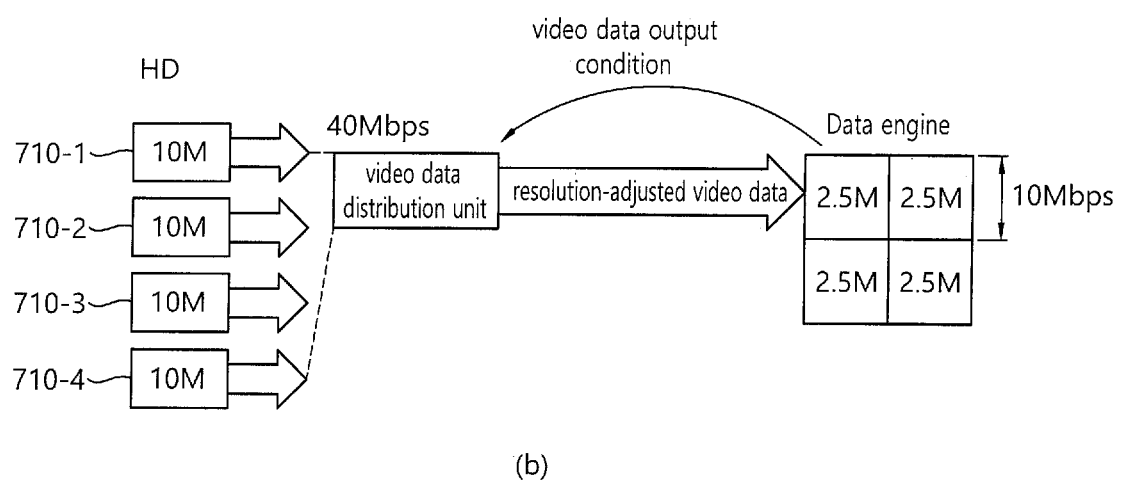
(b)

APPARATUS AND METHOD TO TRANSMIT DATA BY EXTRACTING DATA IN SHOP FLOOR IMAGE, APPARATUS AND METHOD TO RECEIVE DATA EXTRACTED IN SHOP FLOOR IMAGE, AND SYSTEM TO TRANSMIT AND RECEIVE DATA EXTRACTED IN SHOP FLOOR IMAGE

CROSS-REFERENCE TO RELATED APPLICATIONS

This application claims the benefit of priorities of Korean Patent Application No. 10-2018-0045135 filed on Apr. 18, 2018 and Korean Patent Application No. 10-2018-0128940 filed on Oct. 26, 2018, all of which are incorporated by reference in their entirety herein

BACKGROUND OF THE INVENTION

Field of the invention

The present disclosure relates to a method for extracting and transmitting data, and more particularly, a method for efficiently extracting and transmitting data from a shop floor image.

This application is one of the results of Advanced Technology Center Association (ATC) project (Project No. 10052464 (2017.06~2019.05.31), Project Name: Multi-Dimensional Visualization Technique Research for analyzing IoT big data) hosted by Ministry Of Trade, Industry and Energy (MOTIE) and Korea Evaluation Institute of Industrial Technology (KEIT) in Republic of Korea.

Related Art

In general, core business functions required in the manufacturing industry are briefly summarized as follows.

The manufacturing industry may be composed of people, processes, technology and information. From the point of view of information integration in the manufacturing industry, the manufacturing process may be composed of an internal manufacturing process including infrastructure elements associated with performance improvement from raw material receipt to production shipment, and an external process including a product design, material sourcing, product delivery, product services, factory design and maintenance, etc.

A process between manufacturing industries associated with a value chain is largely classified into product development collaboration between partners, B2B transactions for purchasing procurement, and production informatization related to shop floor management, which realizes real-time information integration between shop floors.

In the field of production informatization, in terms of digitization of a production resource on the shop floor which may be the basis for information integration among manufacturing industries, 4M of production resource consists of Man (worker), Machine (production facility), Material, Method (production procedure).

Generally, the production facility (machine) that produces the product automatically is controlled by a complex automation facility such as a PLC (Programmable Logic Controller), a machine tool, and a flexible manufacturing system (FMS) as a digital control device. Mainly, the control device automatically collects information about the production facility with the support of real-time based communication protocols though there is an automatic level difference depending on the level of automation of the control device.

However, even when the production facility is automated well, the facility operating system, as the automated equipment used in the production process, is controlled and operated under physical and logical security policies in the same network at the facility site, for security and control of the facility and equipment. The facility operating system is operated separately from the overall production planning and/or management systems such as MES (Manufacturing Execution System) or ERP (Enterprise Resource Planning) system. Therefore, it is difficult to integrate information between the two systems.

To integrate manufacturing site data and production order data, a separate interface program is required. Such an interface program is difficult to design because the program must be constructed with the same scale and scheme as the number of facilities in the manufacture site, the number of facility operating systems, and the number of development languages and connection schemes.

SUMMARY OF THE INVENTION

An object of an aspect of the present disclosure for solving the above problems is to provide a device and a method for extracting data from a shop floor image and transmitting the data, by which streaming video data of a display screen of a monitor of a facility operating system in the same network that operates the facility and device is encoded in real time, a data presentation location is identified and tagged in the encoded video data to extract numeric value and/or text data, the extracted data is transmitted to a data engine in order for the data engine to efficiently integrate the data.

Further, an object according to another aspect of the present disclosure is to provide a device and a method that may decode video data encoded at a remote site and monitor and control the data in real time.

In a first aspect of the present disclosure, there is provided a device for extracting and transmitting data from a shop floor image, the device comprising: an encoder configured for receiving, from a facility operating system, streaming video data of a display screen of a monitor of the facility operating system on a shop floor, and for encoding the streaming video data in real time; a video data analyzer configured for receiving the real-time encoded streaming video data and for extracting data by figuring out and tagging a data presentation location in the real-time encoded streaming video data using a video data analysis algorithm; and a communication unit configured for transmitting to a data engine the real-time encoded streaming video data, and the data extracted by the video data analyzer.

In one embodiment of the first aspect, the facility operating system comprises a system based on at least one of a sensing/control level, a Programmable Logic Controller (PLC), and a Supervisory Control and Data Acquisition (SCADA) in a production automation process.

In one embodiment of the first aspect, the video data analyzer is configured to locate and tag the data presentation location using the video data analysis algorithm to extract numeric value data and text data from the real-time encoded streaming video data.

In one embodiment of the first aspect, the extracted numeric value data and text data are processed by the data engine into table-based data representing a state change of a facility managed by the facility operating system.

In one embodiment of the first aspect, the device further comprises a video data distribution unit configured to receive the real-time encoded streaming video data, and shop floor image data imaged by a first image acquisition unit of the facility operating system.

In one embodiment of the first aspect, the device is configured to synchronize the streaming video data encoded in the real time, the extracted data, and the shop floor image data based on time information, and to store the synchronized data in a local storage or transmit the synchronized data in real time to the data engine.

In one embodiment of the first aspect, the video data distribution unit is configured: to acquire video data output condition information related to outputting of the real-time encoded streaming video data and the shop floor image data; to adjust resolutions of the real-time encoded streaming video data and the shop floor image data based on the acquired video data output condition information; and to transmit to the data engine the real-time encoded streaming video data and the shop floor image data at the adjusted resolutions.

In one embodiment of the first aspect, the video data distribution unit is configured to determine the resolutions of the real-time encoded streaming video data and the shop floor image data such that data transmission bandwidth used to transmit the data to the data engine is minimized while a first reference resolution of the real-time encoded streaming video data and a second reference resolution of the shop floor image data obtained from the first image acquisition unit are maintained in accordance with the video data output condition information.

In one embodiment of the first aspect, the device further comprises a controller configured to control the video data analyzer and the video data distribution unit, wherein the controller is configured to control the video data distribution unit to relay at least a portion of the real-time encoded streaming video data, the extracted data, and the shop floor image data to the data engine while recording the at least a portion into a queue, wherein the controller includes a switching unit configured for switching an operation mode between a relay operation mode and a recording operation mode based on a state report periodically received from the data engine, wherein (i) in the relay operation mode, the real-time encoded streaming video data, the extracted data, and the shop floor image data are relayed to the data engine, wherein (ii) in the recording operation mode, the real-time encoded streaming video data, the extracted data and the shop floor image data is recorded into a local storage.

In one embodiment of the first aspect, the switching unit is configured to switch the operation mode such that the real-time encoded streaming video data, the extracted data and the shop floor image data buffered into the queue is recorded in the local storage from a time point at which the state report is not received from the data engine.

In one embodiment of the first aspect, the switching unit is configured: to periodically receives a state report from the data engine; to measure a report time from the data engine and calculate an average report reception time; to compare the reception time of the state report from the data engine with a threshold time, and to determines, based on the comparison result, whether a recording error has occurred; and to perform switching between the relay operation mode and the recording operation mode based on a result of the determination, wherein the determination of the occurrence of the recording error is performed based on a report delay time calculated with considering at least one of the measured average report reception time and a maximum buffering time.

In one embodiment of the first aspect, the facility operating system is a based on a first network, wherein the data engine is based on a second network.

In one embodiment of the first aspect, the video data analyzer is configured to determine a video data transmission frame rate based on information associated with a change in a window period between real-time encoded first streaming video data and second streaming video data subsequent to the first streaming video data.

In a second aspect of the present disclosure, there is provided a method for extracting and transmitting data from a shop floor image, the method comprising: receiving, from a facility operating system, streaming video data of a display screen of a monitor of the facility operating system on a shop floor, and encoding the streaming video data in real time; receiving the real-time encoded streaming video data and extracting data by locating and tagging a data presentation location in the real-time encoded streaming video data using a video data analysis algorithm; and transmitting to a data engine the real-time encoded streaming video data, and the data extracted by the video data analysis module.

In a third aspect of the present disclosure, there is provided a device for receiving data extracted from a shop floor image, the device comprising: a receiver configured to receive, from a first terminal, real-time encoded streaming video data, and data extracted from the streaming video data, wherein the real-time encoded streaming video data is generated by real-time encoding streaming video data of a display screen of a monitor of the facility operating system on a shop floor; a decoder configured to decode the received streaming video data and extracted data; and a local storage configured to synchronize the decoded streaming video data and extracted data based on time information and store therein the synchronized data.

In one embodiment of the third aspect, the streaming video data is based on at least one of a sensing/control level, a Programmable Logic Controller (PLC), and a Supervisory Control and Data Acquisition (SCADA) in a production automation process.

In one embodiment of the third aspect, the receiver is configured to receive from a second terminal, via a network, production order data associated with at least one of a manufacturing execution domain of a production automation process and a business domain associated with an enterprise resource planning, wherein the device further includes a data comparison unit configured for comparing the extracted data with the production order data.

In one embodiment of the third aspect, the production order data includes at least one of Manufacturing Execution System (MES) data and Enterprise Resource Planning (ERP) data.

In a fourth aspect of the present disclosure, there is provided a method for receiving data extracted from a shop floor image, the method comprising: receiving real-time encoded streaming video data, and data extracted from the streaming video data, wherein the real-time encoded streaming video data is generated by real-time encoding streaming video data of a display screen of a monitor of the facility operating system on a shop floor; decoding the received streaming video data and extracted data; and synchronizing the decoded streaming video data and extracted data based on time information and storing the synchronized data.

In a fifth aspect of the present disclosure, there is provided a system for transmitting and receiving data extracted from a shop floor image, the system comprising: a data transmission device configured: for receiving, from a facility operating system, streaming video data of a display screen of a monitor of the facility operating system on a shop floor, and for encoding the streaming video data in real time; for receiving the real-time encoded streaming video data and for extracting data by locating and tagging a data presentation location in the real-time encoded streaming video data using a video data analysis algorithm; and transmitting to a data engine the real-time encoded streaming video data, and the data extracted by the video data analysis algorithm; and a data engine configured: for receiving the real-time encoded streaming video data, and the extracted data from the data transmission device; for decoding the received streaming video data and extracted data; and for synchronizing the decoded streaming video data and extracted data based on time information and storing the synchronized data.

BRIEF DESCRIPTION OF THE DRAWINGS

FIG. 7 is a conceptual diagram showing a POD (Pixel On Demand) scheme applied to a video data distribution unit of a data transmission device according to one embodiment of the present disclosure.

DESCRIPTION OF EXEMPLARY EMBODIMENTS

Figure 1A:
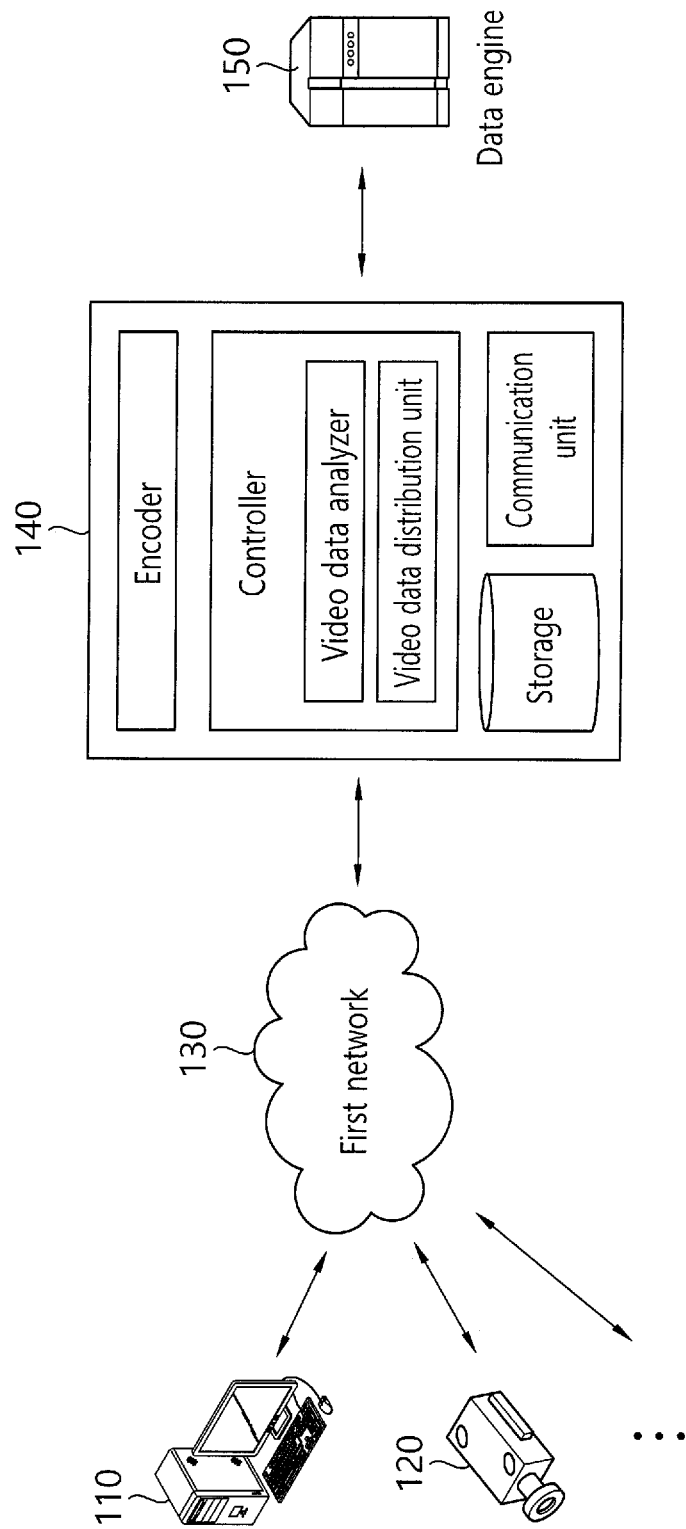
FIG. 1a is a block diagram that schematically shows a system including a data transmission device according to one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section; without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

FIG. 1a is a block diagram schematically showing a system including a data transmission device according to one embodiment of the present disclosure. As shown in FIG. 1a, a system including a data transmission device according to one embodiment of the present disclosure may include a facility operating system 110, an image acquisition unit 120, a first network 130, a data transmission device 140, and a data engine 150.

Referring to FIG. 1a, the facility operating system 110 represents a system for monitoring of a shop floor, and detecting of a facility status, and for collecting production yield. A production facility may refer to a production facility installed at the shop floor. The state of the production facility may include physical phenomena such as temperature, humidity, power, voltage, current, pressure, whether a valve/switch is open or closed, as well as status information related to a performance or yield of the facility. The facility operating system 110 may be configured to sense a state of the production facility based on a plurality of sensors or to directly recognize the operation state of the facility itself. The system 110 may sense the operation state of the production facility and convert the sensed result into an electrical signal, and convert the converted signal into data to generate an operating system screen image. Further, the facility operating system 110 is described with reference to FIG. 1b.

Figure 1B:
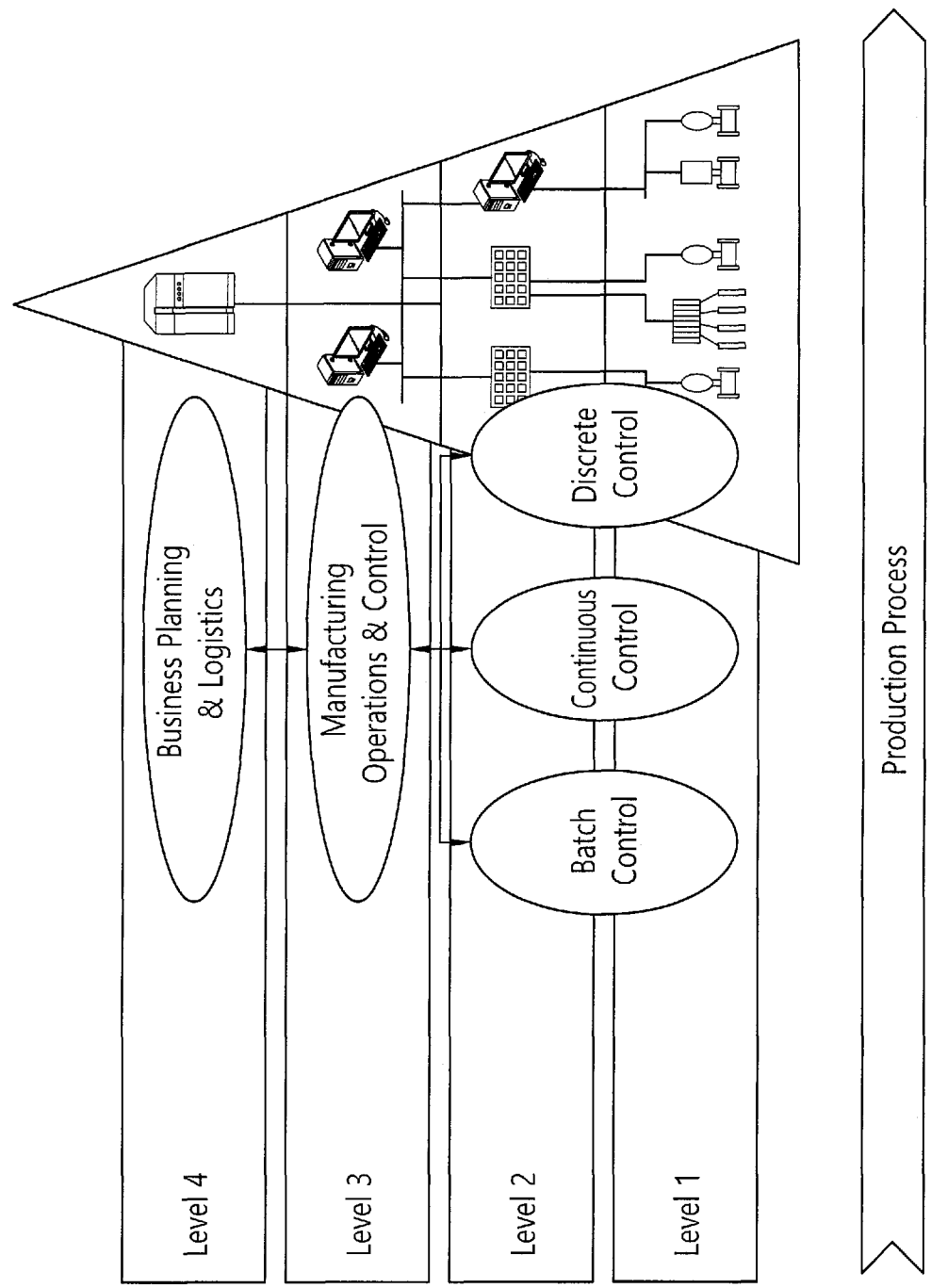
FIG. 1b shows a conceptual view of a hierarchical structure of a manufacturing system.

FIG. 1b shows a hierarchical structure of a manufacturing system. Referring to FIG. 1b, a level 1 domain (Lv.1 domain) is a domain related to a facility controller. The domain is based on a component controller, robot and sensor. This domain includes a facility control-related system such as HMI (Human Machine Interface), PLC (Programmable Logic Controller) and/or PCS. Intangible basic processes in a factory, and facility resources, which are physical entities responsible for the intangible basic processes are at the lowest level.

A level 2 domain (Lv.2 Domain) is a domain related to a production control system. In this domain, production-related bigdata analysis, CPS (Cyber Physical System) technique, etc. may be utilized. Supervisory Control and Data Acquisition (SCADA) and Distributed Control System (DCS) are systems related to the level 2 domain. A physical virtual system associated with devices in the level 1 domain (sensors, actuators, electric motors, consoles, switches, valves, connectors, etc.) at a forefront of the production automation line may belong to the level 2 domain. The physical virtual system may be a kind of hardware-software interface in machines and processes. In this level, a relationship such as PLC (master)-sensor node (slave) is defined. In some cases, an upper master PLC for controlling the lower PLC, industrial PC, or the built-in controller in the machine may be operated in this level.

The PLC collects information related to items such as a part count, scrap count, Product ID, Operator ID, Production Order ID, Ideal Cycle Time, Shift, Available Indicator, Running Indicator, Downtime Indicator, etc. defined in the upper level (mainly, MES of a level 3) using signals from sensors or machines, and controls a corresponding entity according to the information value and passes the control result back to the upper level.

The level 3 domain (Lv.3 Domain) is a domain related to a manufacturing execution system. This level may be a level for collecting unit factory production results, performing plan-based execution analysis, and performing jobs related to the calculation of a processing cost based on plant inventory. MES (Manufacturing Execution System), and WMS (Warehouse Management System) are related to the level 3 domain.

A level 4 domain (Lv.4 Domain) is a business domain related to enterprise resources/planning. In this level, financial/accounting-oriented enterprise support management (ERP), research and development, demand forecasting and production planning management, and raw material and product inventory-based management are conducted. In addition to a system for the Enterprise Resource Planning (ERP), systems for customer relationship management (CRM), supply chain management (SCM), and product lifecycle management (PLM) may be related to this domain. The Level 3 domain and level 4 domain data may also be called production order data.

The level 1 domain (sensing and control) and the level 2 domain are mainly operated individually based on physical locations and security network operation policies for security and variable control of wired connection or facility and equipment operation. The level 3 or higher domain operates in a typical office environment. In this connection, because communication and/or data collection between two domains is incomplete, smooth communication and data transmission/reception between the two domains may be required. It may be difficult for the same network to collect full communication and data due to the network security policy.

In this regard, the facility operating system 110, which is associated with the data transmission device 140 according to the embodiment of the present disclosure may process an operating-system screen image associated with the level 1 and/or level 2 domains. The system 110 communicates with the data transmission device 140 via a first network 130. The data transmission device 140 may also communicate with the level 3 and/or level 4 domain-based data engine 150 via a wired and/or wireless network. In this regard, the data transmission device 140 is capable of communicating via the level 1/level 2 based system via the first network 130. The device 140 may be associated with a company network and may handle all level 3/level 4 based systems. Further, the device 140 relays data associated with the level 1/level 2 to the data engine 150. Thus, the data engine 150 performs comparison and analysis between the level 3/level 4 data and the level 1/level 2 data.

Referring again to FIG. 1a, with considering the above relationship, the data transmission device 140 communicates with the level 1 and/or level 2 facility-based operating system 110 and/or image acquisition unit 120 over the first network 130. The facility operating system 110 may be a system related to sensor/control, PLC, and PCM-based level 1 domain and SCADA-based level 2 domain. The system 110 processes the operating-system screen generated by programs in the domain. The operating-system screen may be displayed on the monitor of the facility operating system 110. In this connection, the facility operating system 110 provides video data of a monitor display screen of the facility operating system 110 to an encoder of the data transmission device 140 in a streaming manner. The encoder encodes the streaming video data of the display screen as received in real time, and provides the encoded data to a video data analyzer. The video data analyzer extracts meaningful data from the real-time encoded streaming video data. The analyzer may then store the extracted data directly in a local storage or in real time to the data engine 150 via a communication unit. Further, the data transmission device 140 may store or transmit the meaningful data (e.g., numerical and/or text data) as extracted by the video data analyzer to the local storage or to the data engine 150.

Further, the image acquisition unit 120 may acquire an image associated with the facility monitored by the facility operating system 110. The image acquisition unit 120 may be a component included in the SCADA system. The image acquisition unit 120 may be implemented as imaging means such as a camera. The imaged shop floor image data is provided to a video data distribution unit of the data transmission device 140 over the first network 130 in real time. The video data distribution unit receives the streaming video data encoded in real time by the encoder and the site image data taken by the image acquisition unit. Then, the video data distribution unit adjusts a resolution of the data according to an output condition from the data engine 150 and provides the video data to the data engine 150.

The data engine 160 is a server-based device that is associated with external devices through the company network. That is, the data engine may receive the level 3/level 4-based data such as MES and/or ERP from the external device via the company network. Further, the data engine analyzes and monitors the streaming video data as received from the data transmission device 140, the extracted data, and the imaged shop floor image data. The data engine may display the data at a glance. In this connection, the data engine may concurrently display the level 3/level 4-based data and compare, and analyze the data to determine current production efficiency and expected performance.

Figure 2:
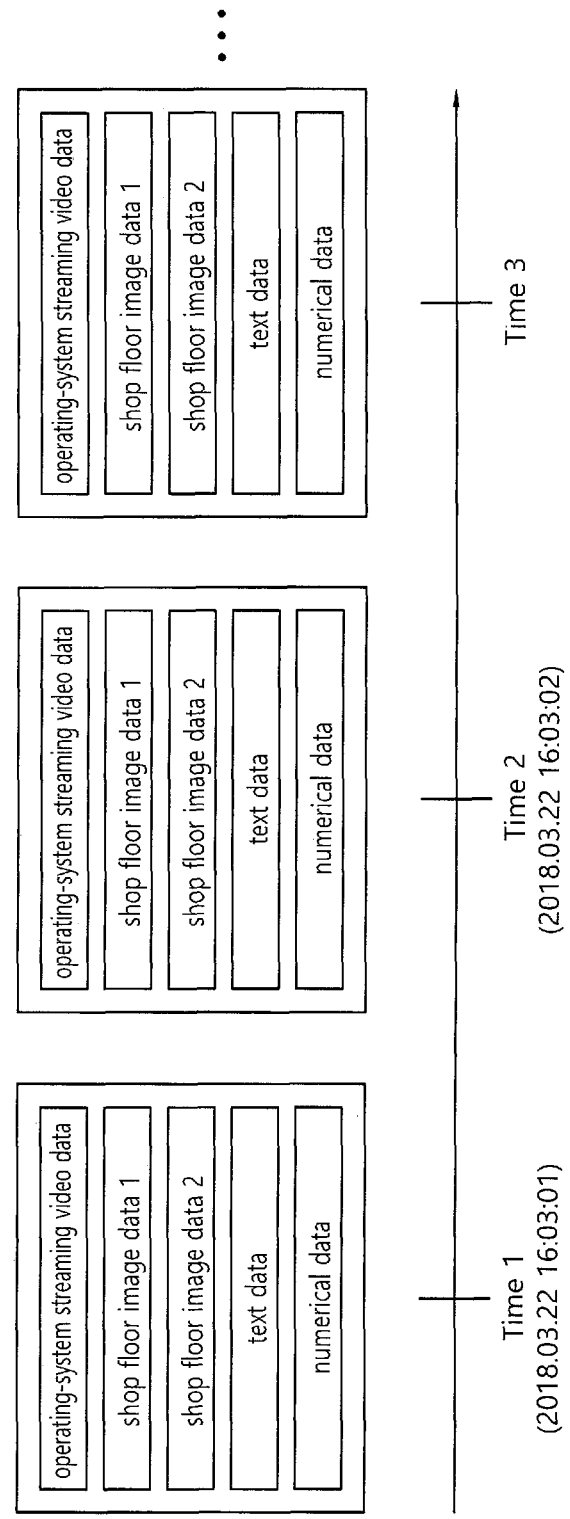
FIG. 2 is a conceptual diagram for illustrating how the data transmission device according to one embodiment of the present disclosure synchronizes and store production-related data based on time information.

FIG. 2 is a conceptual diagram illustrating a method for synchronizing and storing the production-related data based on time information by the data transmission device according to one embodiment of the present disclosure.

Referring to FIG. 2, a controller of the data transmission device synchronizes the received data related to the facility of the shop floor based on time information and stores the data into the local storage. In this connection, for the synchronization, time information such as a timestamp may be inserted in the video data and/or the extracted numerical/text data as related to the state of the facility. The data may then be provided to the data engine with the timestamp.

In this connection, the information stored with the time information may include the streaming video data of the monitor of the facility operating system encoded in real time by the encoder, at least one site data (CCTV image for shop floor, etc.) received from the image acquisition unit, and the state data of the facility (temperature, humidity, power, voltage, current, pressure, whether the valve/switch is opened or closed, and yield data, etc.). The state-related data of the facility may be synchronized based on the time information and stored in the local storage. In this connection, file locations where the data are physically stored may be the same or may be different.

Further, such synchronized information may be transmitted to the data engine at the same time as the information is stored. Alternatively, the synchronized information may be transmitted to the data engine via a communication protocol in real time, rather than being stored in the local storage. In this connection, the data may be sent with the timestamp information. Accordingly, the data engine may process the encoded streaming video data, site data, and state data using the time information.

Figure 3:
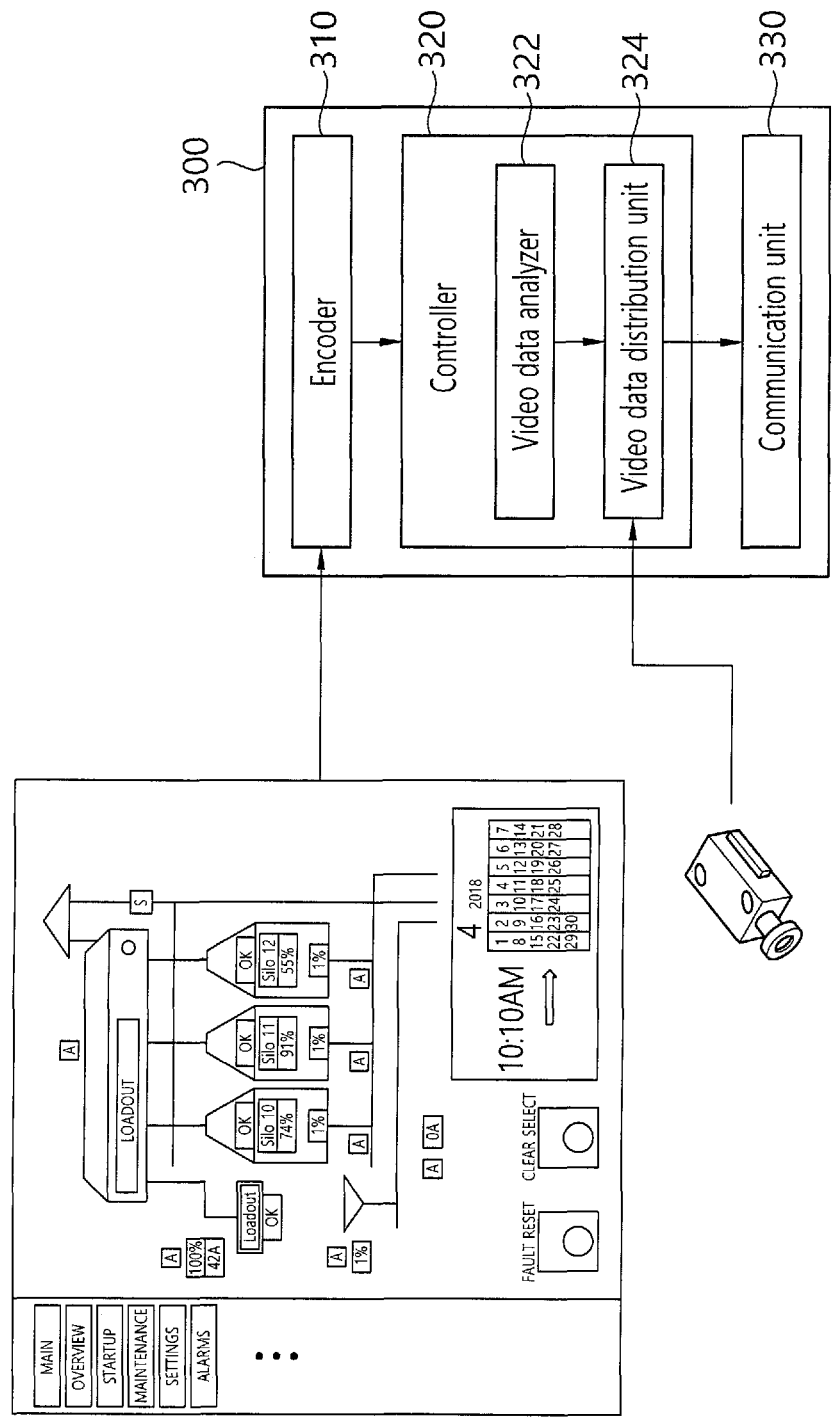
FIG. 3 shows a detailed block diagram of a data transmission device according to one embodiment of the present disclosure.

FIG. 3 is a detailed block diagram of a data transmission device according to one embodiment of the present disclosure. As shown in FIG. 3, the data transmission device 300 may include an encoder 310, a controller 320, and a communication unit 330. In this connection, the encoder 310 may be implemented as a separate computing unit. Further, in addition to the encoder 310, each of other components (e.g., video data distribution unit 324) may be implemented as a separate computing unit. As such, the device 300 may be implemented as a combination of three or more computing units. Alternatively, the device 300 may be implemented as a component in one computing unit.

Referring to FIG. 3, the streaming video data on the display screen of the monitor of the facility operating system is provided to the encoder 310 of the data transmission device 300. The encoder 310 may encode in real time the received display screen data of the monitor of the facility operating system. The encoder may capture every frame of the received display screen data and encode the captured data in real time. The encoder then provides the real-time encoded data to the controller 320.

The controller 320 may include a video data analyzer 322 and a video data distribution unit 324.

The video data analyzer 322 extracts data presented as numerical and/or text data from the real-time encoded data. In this connection, the data presentation location may be tagged. This operation may be accomplished by the user manually setting the tag position. Alternatively, the device may tag the tag position using a numeric/text optical recognition technique such as Optical Character Recognition (OCR). This allows meaningful data to be collected from typical bigdata. The numeric/text data as extracted by the video data analyzer 322 may be processed and stored so as to indicate the state of each facility.

The video data distribution unit 324 receives the streaming video data generated by the encoder 310 and receives the shop floor image data from the external image acquisition unit. The video data distribution unit 323 then receives information related to the output condition from the data engine. Then, the unit 323 determines resolution of each video data to meet the output condition of the data engine. The unit 323 then re-encodes the video data based on the determined resolution and provides the re-encoded data to the communication unit 330. The communication unit 330 may then transmit the re-encoded video data of the adjusted resolution to the data engine.

The communication unit 330 is a component for transmitting data to the data engine. The communication unit may include an antenna and/or a communication processor.

Figure 4:
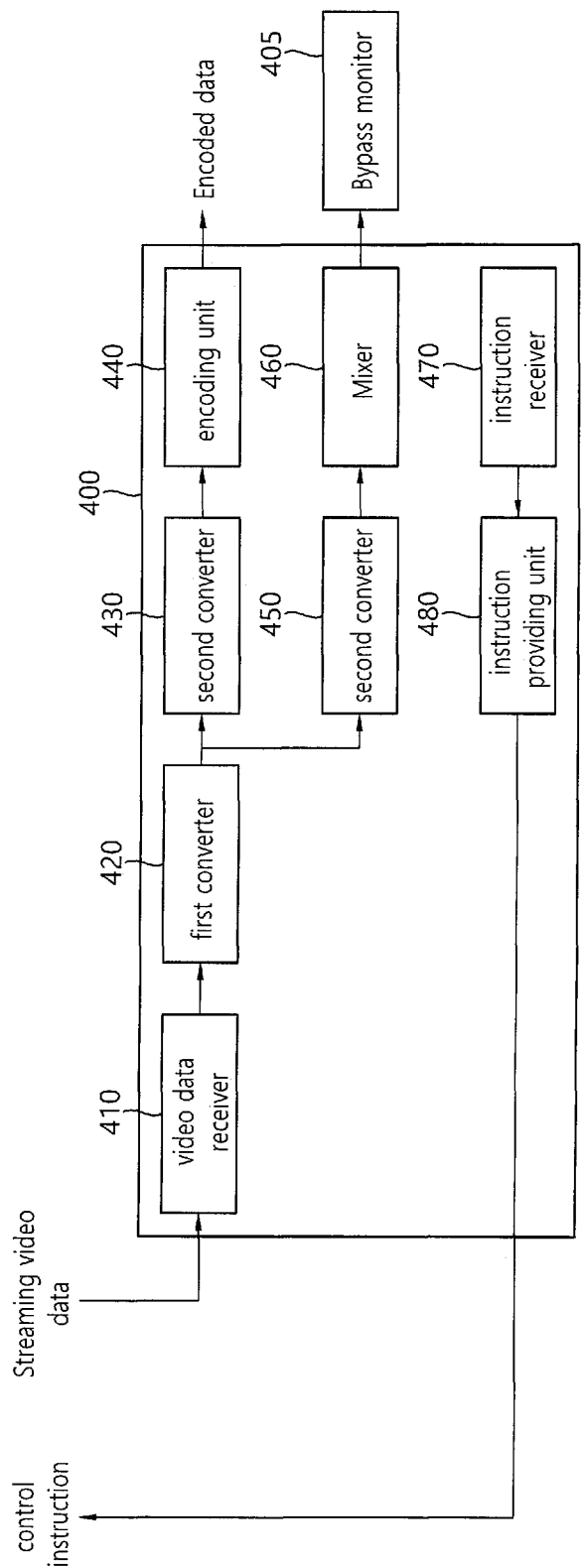
FIG. 4 shows a detailed block diagram of an encoder of a data transmission device according to one embodiment of the present disclosure.

FIG. 4 is a detailed block diagram of an encoder of a data transmission device according to one embodiment of the present disclosure. As shown in FIG. 4, the encoder according to one embodiment of the present disclosure includes a video data receiver 410, a first converter 420, a second converter 430, an encoding unit 440, a second converter 450, a mixer 460, an instruction receiver 470, and an instruction providing unit 480.

Referring to FIG. 4, the video data receiver 410 receives display screen data of a monitor from the facility operating system in a streaming format. The video data receiver 410 may receive the streaming video data of the display screen of the monitor of the facility operating system in a state in which the receive is connected to the system in a wired manner (e.g., via a digital interface) or wirelessly.

The video data receiver 410 may utilize a digital interface such as HDMI/DVI. The receiver 410 may convert the streaming video data received from the facility operating system into a MIPI CSI (Mobile Industry Processor Interface for Camera Serial Interface). MIPI CSI may be an interface between the facility operating system and the host processor. The MIPI CSI conforms to standard protocols such as CSI-1, CSI-2, CSI-3 and CSI-4.

The first converter 420 receives the MIPI CSI-based streaming video data of the facility operating system from the video data receiver 410 and converts the data into a YUV data format. According to the present disclosure, the converted YUV data may include the YUV 420 data format. The YUV 420 data formats may include a legacy format (legacy YUV 420) for compatibility with legacy systems and a non-legacy YUV 420 format for lower cost implementation. The first converter 420 provides the streaming video data of the facility operating system having the YUV format to the second converters 430 and 450 via two divided channels. In this connection, over the first channel through the second converter 430, the data may be encoded and then sent to the controller, while over the second channel through the second converter 450, the data may be mixed and then may be provided to a bypass monitor 405.

The second converters 430 and 450 convert the YUV data into RGB data. Since the YUV format may have a high compression ratio, it is preferable that the data having the YUV format is converted into RGB format data of a low compression ratio having red R, green G, and blue B, for example. The conversion scheme by the second converter 430 may include at least one of the 4:2:0, 4:2:2, and 4:4:4 conversion schemes. However, the present disclosure is not necessarily limited thereto.

The encoding unit 440 encodes the streaming video data of the facility operating system having the RGB format as converted by the second converter 430. The encoding scheme may include various encoding schemes including HEVC (High Efficiency Video Coding) (H.265), H.264/AVC, SVC (Scalable Video Coding), MVC (Multiview Video Coding), DivX, WMV (Window Media Video), VP8, VP9, etc. The appropriate encoding scheme may be selectable by user configuration and may be changed via the user interface. Further, the encoding unit 440 may change the resolution, frame rate and/or bit rate via user settings and encode data correspondingly. The encoding unit 440 may encode data on a frame-by-frame basis. Alternatively, the encoding unit may divide one frame into frame units (e.g., ¼ frame), encode the divided frame units, and provide the encoded data to the controller.

The controller transmits the streaming video data of the facility operating system encoded by the encoding unit 440 to the data engine. The controller may receive and packetize one complete frame from the encoding unit 440 and send the packetized data to the data engine. Alternatively, the controller may receive encoded data on a per-frame basis, packetize the data, and send the packetized data to the data engine. The controller transmits the encoded data to a third terminal device via a real-time communication protocol such as RTP or RTSP.

The mixer 460 may mix the streaming video data of the facility operating system having the RGB format converted by the second converter 450 into a format that can be outputted via a digital interface such as HDMI/DVI and/or via a wireless network. The mixed data may be provided to the bypass monitor 405 connected through the digital interface and/or the wireless network.

As the video stream is output to the bypass monitor via this mixing process, the bypass monitor 405 may present the screen data processed by the data transmission device and transmitted to the data engine toward a user of the data transmission device. The user of the data transmission device may check the screen of the facility operating system that is currently remote controlled. Further, the user may check the display screen of the monitor of the facility operating system that is changed by the remote control. For example, when the user of a remote data engine clicks a particular icon on the monitor of the facility operating system and activates a function corresponding to the icon, the change in the screen of the facility operating system may be displayed on the bypass monitor 405. This allows the user of the data transmission device to perceive the change.

The instruction receiver 470 receives a control instruction from the data engine via the controller. The control instruction may be issued from a remote location from the facility operating system. When a user of the data engine views the monitor screen of the facility operating system, the user of the data engine issues the control instruction using a user interface (not shown) connected to the data engine. The control instruction may include cursor movement, cursor click, character/number/sign input, instruction input, and so on.

The instruction providing unit 480 parses the control instruction received from the instruction receiver 470 and provides the parsed instruction to the facility operating system. The facility operating system receives the instruction and implements the instruction of the user associated with the data engine.

Figure 5:
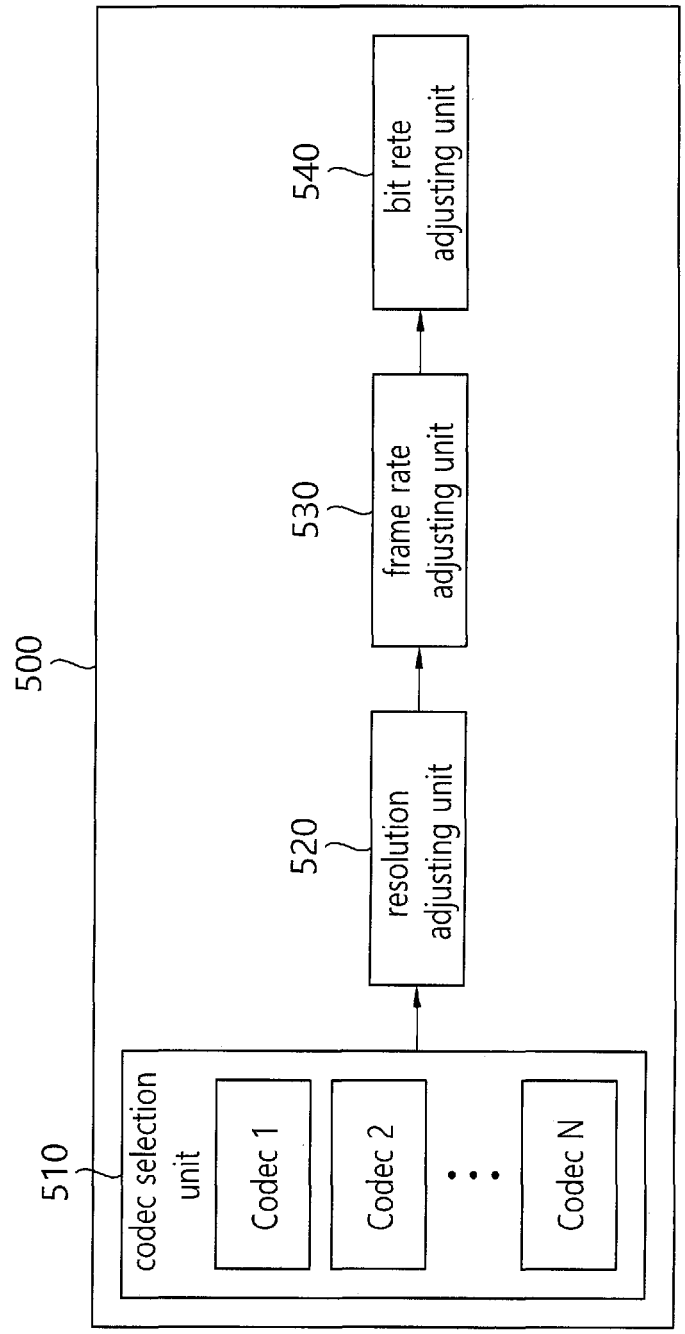
FIG. 5 shows a detailed block diagram of an encoding unit of the data transmission device according to one embodiment of the present disclosure.

FIG. 5 is a detailed block diagram of an encoding unit of the data transmission device according to one embodiment of the present disclosure.

As shown in FIG. 5, an encoding unit 500 according to one embodiment of the present disclosure may include a codec selection unit 510, a resolution control unit 520, a frame rate control unit 530, and a bit rate control unit 540.

Referring to FIG. 5, the codec selection unit 510 selects one codec among a plurality of codecs (codec 1, codec 2, . . . , codec N). The codec selection unit 510 is configured to select one of a plurality of codecs according to a user setting. The codec selection unit 510 first performs the encoding using a codec 1 set as a default codec. When there is a codec change according to the user setting, the codec selecting unit 510 may be configured to perform the encoding using a changed codec 2.

The resolution control unit 520 adjusts the resolution of the frame in connection with the encoding. That is, the resolution control unit may adjust the degree of rendering delicacy of the encoded data. The resolution may be defined using the number of horizontal pixels and the number of vertical pixels. There may be a numeric value that is set to a default resolution value. The user may arbitrarily change the resolution value via the user interface. Alternatively, a plurality of modes (3840×2160, 1920×1080, 1280×720, 1024×768, 800×600, 320×180, etc.) may be pre-set, and one of the modes may be variably selected.

The frame rate control unit 530 adjusts the frame rate in relation to the encoding and the bit rate control unit 540 adjusts the bit rate in relation to the encoding. The frame rate control unit 530 may provide various frame rates such as fps 15, 30, and 60, or may apply fps set regardless of the resolution. The frame rate and bit rate may have default values. The user may arbitrarily change the frame rate value and the bit rate value via the user interface. The frame rate may refer to the number of frames per second, and the bit rate may be defined as the amount of information per second. Arbitrarily adjusting the frame rate and/or bit rate by the user may effectively control the quality of the streaming video data of the facility operating system. That is, when the data transmission device deals with the video data with the high definition depending on the characteristics of the facility operating system, the encoding related parameters of the data transmission device are adapted to the high definition and the encoding is performed using such adapted parameters. Thus, a user at a remote location may view the streaming video data of the facility operating system having the high definition. Conversely, when the data transmission device can handle relatively low-quality or low-definition data, the encoding-related parameters may be adapted to the lower definition and thus the encoding may be performed using the adapted parameters.

Figure 6:
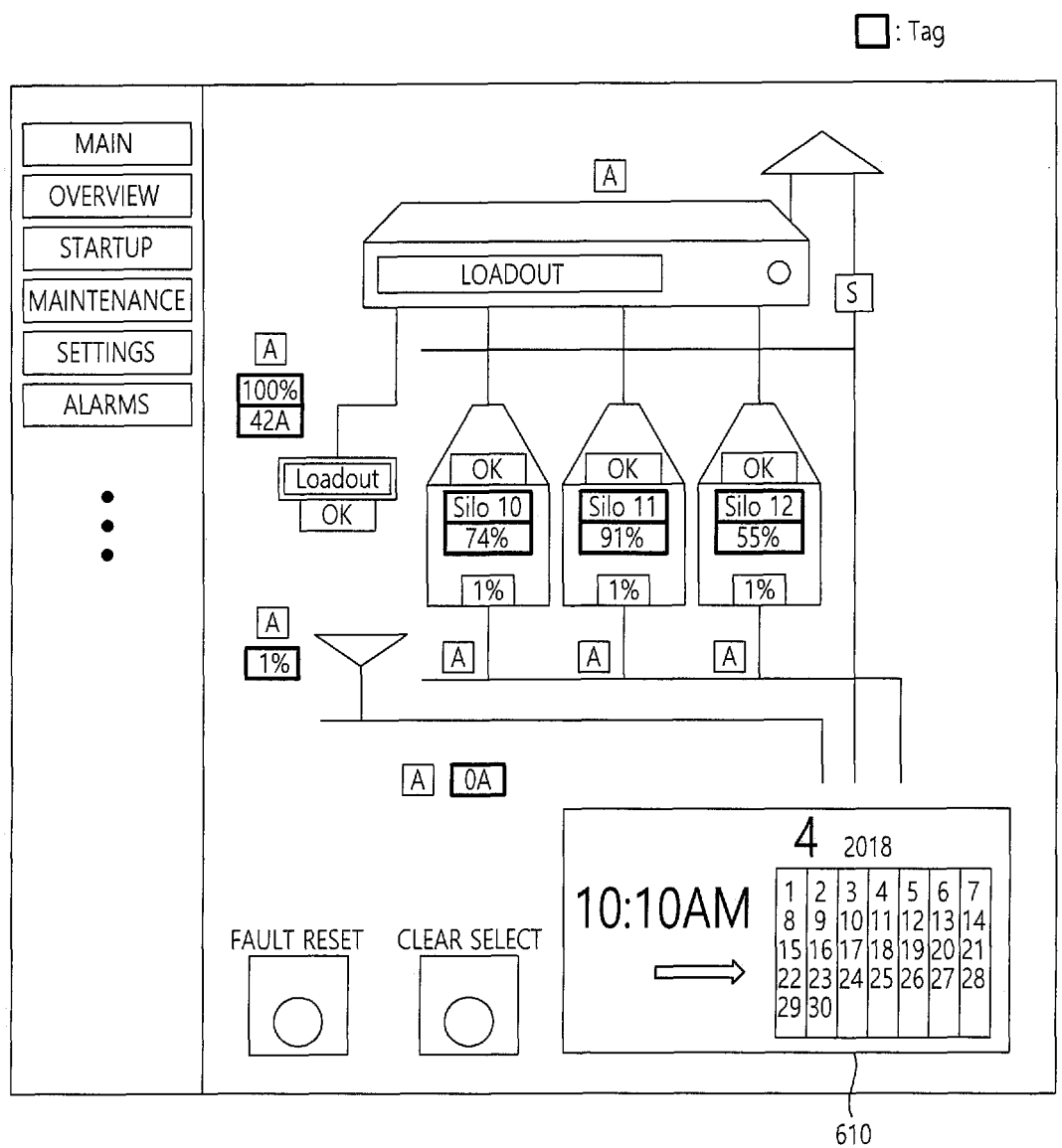
FIG. 6 shows an example of a state in which a data presentation location is tagged in the display screen of a monitor of the facility operating system.

FIG. 6 shows an example of tagging a data presentation location on the display screen of the monitor of the facility operating system.

Referring to FIG. 6, the facility operating system manages multiple facilities. In this connection, the facilities may include components such as sensors, actuators, electric motors, consoles, switches, valves and connectors. Further, the facility operating system may monitor the state of each facility using sensors, control signals, and/or its own performance management devices associated with each facility. The monitored information is collected by the facility operating system. As described above, the state information of each facility includes physical phenomena such as temperature, humidity, power, voltage, current, pressure, whether the valve/switch is open or closed. The state information may further include at least one of state information (current yield or execution rate) related to performance.

In FIG. 6, the tagged portion is represented as a square block. The tagged portion represents the data portion associated with each facility's state. This tagged portion may be set by the user to be adapted to each page. For example, an entire main facility screen may be configured such that a tagged portion is positioned in first and second regions of the monitor's display screen. The screen associated with the alarm may be configured such that the tagged portion is located in a third region and a fourth region of the display screen of the monitor. Thus, the corresponding tagged portions may be positioned differently between the screens. The numerical and/or text data may be extracted from the tagged portion. This extracted value may be matched with a facility whose state may be indicated by the extracted value. This match may be stored. That is, data of the first facility may be configured to be located in the first region. Then, it is monitored in real time that the value at the tapped location of the first region is changed. This allows the state of the first facility to be checked in real time. The value at this tagged portion is extracted separately. Then, the data engine may also process the value into structured data, such as a table, that represents the state of each facility. However, extraction of data according to the setting of the tagged portion is not necessarily performed based on the user setting. The system may automatically perform the numerical and/or text data extraction using the optical character recognition such as OCR, without requiring the separate user setting. The data extracted from the OCR analysis without the user setting may be matched with other data extracted from the same location, and, then, the matching may be stored. The user may impose meaning to a change of the data extracted at a specific position. Such a data change may indicate the state change. The data extracted by OCR analysis may contain data that does not represent a particular state, such as data associated with a facility name. Therefore, this data portion may be excluded. Rather, only a portion of the data whose data value changes over time may be separately recognized and stored. The change in the extracted data may represent a specific state value of a particular facility. In this way, the automatically extracted data may also be useful. Further, in addition to numeric/text data, data classified by colors such as warning indication data may be extracted via tagging according to the user setting or via tagging according to other image analysis tools. Regarding this color-dependent data portion, red may indicate "warning" and green may indicate "normal". Thus, colors may be meaningful and may represent a facility state.

Further, in the date display portion 610 in the lower right of FIG. 6, date and time may be displayed. The video data analyzer may know the time information about the extracted data based on the time information of the date portion from the encoded streaming video data. This time is eventually the time of the facility operating system. This time may be considered separately from the time managed by the data transmission device. That is, the time in the streaming video data and the time imposed by the data transmission device in response to the reception of the streaming video data may be different from each other. Both may be stored and managed together. In this connection, the video data analyzer may insert a time stamp based on the reception time of the streaming video data (which may be different from the date/time portion of the streaming video data), thereby securing the time information. Using the inserted time stamp, video data and numeric/text data in the specific time period may be checked.

According to one embodiment of the present disclosure, the extracted data may include data related to silos and data related to robot arms (AI ARMS). Based on the extracted data, the current state of each silo and the current state of each robot arm may be identified. In other words, in one frame of the streaming video data of the facility operating system, numerical/text data regarding the plurality of facilities and detailed components of each facility may be secured. That is, the state information (e.g., current yield, progress, temperature information, power information, valve/switch state, etc.) about each of the robot arms of each silo of the first facility and about each of the robot arms of each silo of the second facility may be generated in real time. Then, the generated information may be stored together with the streaming video data. The extracted data in real time may be stored together with a time stamp based on extraction-related time information. Further, the real time encoded streaming video data associated with the facility operating system, the extracted data therefrom, and/or the shop floor image data may be recorded together based on the timestamp and then transmitted to the external data engine.

FIG. 7 is a conceptual diagram showing a POD (Pixel On Demand) scheme applied to a video data distribution unit of a data transmission device according to one embodiment of the present disclosure.

Referring to FIG. 7, FIG. 7a is a conceptual diagram showing a case where a plurality of video data is provided to a data engine in a general scheme. In this connection, video data 1 710-1 may be the streaming video data of the facility operating system encoded in real time by the encoder, while video data 2 to video data 4 710-2 to 710-4 may be shop floor image data obtained from a plurality of image acquisition units. Each of the video data 710-1 to 710-4 has a specific resolution. Each video data may have appropriate quality when each video data is provided using a bandwidth of 10 Mbps (bit per second). Accordingly, in order for the data transmission device to transmit the video data 1 to the video data 4 7101 to 710-4 requiring the transmission bandwidth of 10 Mbps to the data engine. a bandwidth of 10 Mbps×4=40 Mbps may be required.

FIG. 7 b is a conceptual diagram illustrating the POD scheme applied to the video data distribution unit of the data transmission device according to one embodiment of the present disclosure. In FIG. 7b, assuming that each of all of the streaming video data of the facility operating system as encoded from the encoder and the shop floor image data has a reference resolution corresponding to a bit rate of 10 Mbps. This reference resolution may be the reference resolution at the initial time of transmission. In the case of encoded streaming video data, the initial reference resolution may indicate the encoding resolution of the data to be encoded. Since other video data are video data directly transmitted to the video data distribution unit without passing through the encoder, the resolution of the video data when the other video data are received by the video data distribution unit may be the reference resolution. The reference resolution may be changed according to the user setting. Further, it is desirable that general data other than the video data is not subjected to the POD scheme according to one embodiment of the present disclosure.

In such an embodiment, the video data distribution unit receives all of the input video data 1 to 4 710-1 to 710-4 using a bandwidth of 40 Mbps, and the unit performs appropriate resolution adjustment of the received video data, thereby maximizing the efficiency of the transmission bandwidth. The video data distribution unit may also obtain information about the video data output conditions from the data engine. The video data output condition information may be information related to a condition at which the data engine outputs the video data. The condition information includes information on the number of video data to be output and video data identification information, size and arrangement of output video data. For example, the video data 1 to 4 710-1 to 710-4 are all output. In this connection, when the video data 1 to 4 710-1 to 710-4 are divided and displayed in quadrant portions on the display means (e.g., monitor, TV, etc.) associated with the data engine, the identification number of the output video data and the output size information about the video data corresponding to the identification number are provided from the data engine to the video data distribution unit.

The video data distribution unit specifies video data to be transmitted based on the video data identification number among the video data output condition information received from the data engine. The distribution unit may determine the resolution corresponding to the specified video data based on the output size information of the video data. In this connection, the resolution may be determined as a resolution value such that the bandwidth for transmission of the video data to the data engine is minimized while the original resolution of the video data or the reference resolution thereof is kept at the video data output condition from the data engine. For example, in the embodiment of FIG. 7b, four video data, each having a resolution requiring a transmission bandwidth of 10 Mbps are transmitted. The corresponding video data is reduced to in a size of ¼ thereof. That is, the resolution of each of all video data is reduced to ¼ thereof. In this connection, this reduction may not be recognized on the output screen of the data engine. Therefore, adjusting the resolution to a ¼ thereof may allow requiring a transmission bandwidth of 2.5 Mbps per one video data, rather than 10 Mbps per one vide data. It is preferable to transmit the four video data using a total bandwidth of 2.5 Mbps×4=10 Mbps instead of 40 Mbps. This is the POD scheme applied to the video data distribution unit of the present disclosure.

According to an embodiment of the present disclosure, video data may be displayed on the display means of the data engine in an overlapping form. Therefore, a bandwidth exceeding 10 Mbps may be required for a screen that displays a combination of a plurality of video data having a reference resolution of 10 Mbps. Further, since video data may not be presented on the entire region of the display means of the data engine, for example, data in text, numbers, or other formats may be displayed, a bandwidth of 10 Mbps or less may be used.

Figure 8:
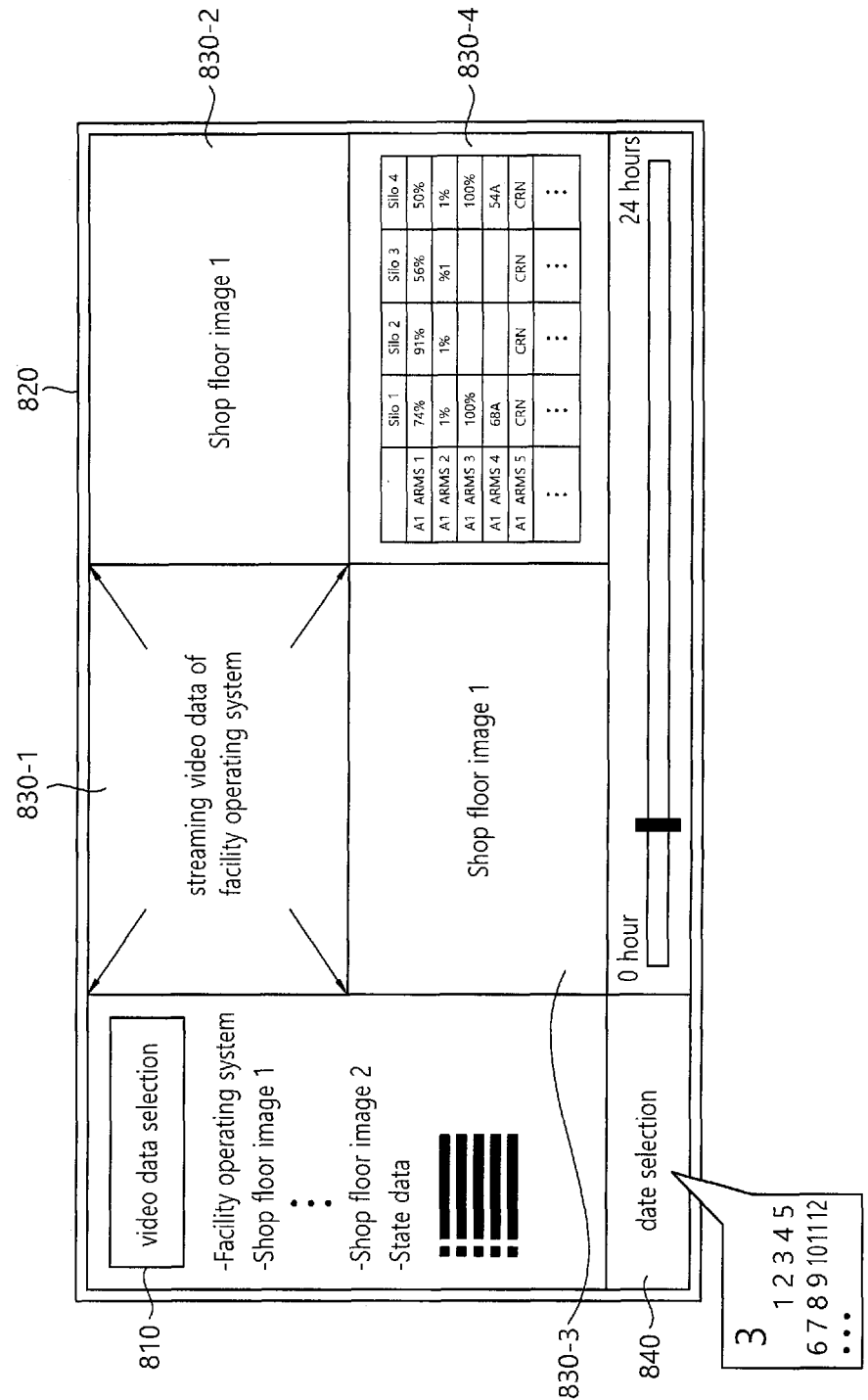
FIG. 8 shows an exemplary screen in which data received from a data transmission device according to one embodiment of the present disclosure is utilized by data engine.

FIG. 8 shows an exemplary screen on which the data engine utilizes data received from a data transmission device according to one embodiment of the present disclosure.

Referring to FIG. 8, the data transmission device stores the video data, audio data and extracted data synchronized based on the time information directly into the local storage and extracts the data therefrom later. Alternatively, the device may transmit the data to an external data engine in real time.

Data transmitted from the data transmission device to the data engine may be utilized as shown in FIG. 8. That is, it may be determined, via the video data selection icon 810, which video data is output on the viewer of the data transmission device or the data engine. A type of video data to be output corresponds to a type of the collected video data. That is, a table may be generated based on the streaming video data of the facility operating system, the shop floor image data 1 to N, and the extracted numeric/text data.

In the embodiment of FIG. 8, it is assumed that the streaming video data of the facility operating system, the shop floor image data 1 and 2, and the extracted numeric value/text data are displayed in four divided cells. One monitor includes a plurality of cells 830-1, 830-2, 830-3, and 830-4. One meaningful screen may be output on each of several cells. In this connection, one physical monitor may be called a canvas 820. That is, the canvas 820 may be divided into a plurality of squares, or rectangular cells 830-1, 830-2, 830-3, and 830-4.

According to the embodiment of FIG. 8, the data engine displays the streaming video data of the facility operating system on the monitor connected thereto and on the cell 830-1. The data engine displays the site image data 1 on the cell 830-2 and the site image data 2 on the cell 830-3. The data engine displays the table-based data processed based on the numeric value/text data on the cell 830-4 of the monitor. In this connection, the specific screen in each cell, and the size of each cell may be set and changed via the data engine's user interface (not shown). Further, the selection of the state data to be displayed on the table-based data screen, and the selection of the display of other types of data (e.g., numeric value, text, graph, chart, etc.) other than the table-based data may also be arbitrarily changed by the user. For example, the displayed state data may include data about each facility (data in the form of a list of the current states of a specific facility), data about each state (for example, data indicating specific states such as switch On/Off, temperature, and power, etc.).

Using the date selection icon 840, the user may select whether past data transmitted to the data engine should be displayed on the screen or current data transmitted in real time should be displayed on the screen. When data currently being transmitted in real time is displayed on the screen, the size of each of the cells 830-1, 830-2, 830-3, and 830-4, and information related to specific video data to be displayed on each of the cells 830-1, 830-2, 830-3, and 830-4, which are related to the display settings of the screen may be transmitted to the data transmission device in real time. This allows the video data distribution unit of the data transmission device to transmit video data as adjusted to the optimal resolution using the POD scheme.

When past data should be displayed on the screen, the data time points for all cells 830-1, 830-2, 830-3, and 830-4 may be specified. For example, the data reproduction time point may be specified to a past specific date (for example, 15 days) of March. In this connection, the time bar 850 corresponding to the date may be displayed at the bottom of the screen. In this connection, when the specific time point is set using the time bar 850, data corresponding to the corresponding point in time is loaded and displayed on each of the cells 830-1, 830-2, 830-3, and 830-4. That is, when data corresponding to the time point of 03:15:03 on 3/15 is reproduced, the streaming video data of the facility operating system at the time point of 03:15:03 on March 15 is displayed on the cell 830-1, the site image data 1 at 03:15:04 on March 15 is displayed on the cell 830-2, the site image data 2 at 03:15:04 on March 15 is displayed on the cell 830-3, and the table-based data at the time of 03:15:04 on March 15 may be displayed on the cell 830-4. That is, the user of the data engine may check various video data and audio data, structured/non-structured data corresponding to the specific time point on the screen at a glance. This allows the user to comprehensively understand the situation at a specific time point. In this connection, the data engine may utilize a separate video data analysis module (not shown). For example, the data engine may analyze a plurality of video data over time using the video data analysis module. When a specific event is detected based on the pre-stored detected item, the data engine automatically detects and analyzes other video data corresponding to the specific time point associated with the detected event, together with the video data. This allows efficient analysis of the shop floor-related situation.

Further, a configuration in which data time points may be set differently between cells will be apparent to those of ordinary skill in the art. For example, the cell 830-1 may display video data at a time point 1, and the cell 830-2 may display video data at a time point 2.

Additionally, the cells may be arranged in an overlapping form. For example, one cell may exist ahead of other cells. In a stereoscopic view, the streaming video data of the facility operating system may appear to pop out. Other video data may be arranged in the lower end of the cell in which the streaming video data of the facility operating system is displayed, thereby providing an overlapping video data arrangement. The overlapping video data arrangement, the specific video data to be displayed on the overlapping cells, and the sizes of the overlapping cells may be arbitrarily adjustable via the user interface.

Furthermore, the data engine may receive and store information about level 3 and/or level 4 domains through the company network. This allows the data engine to display data of the production operating system and MES and/or ERP data of the level 3 and/or level 4 domains on different cells. On a single screen, the production operating system data and MES and/or ERP data of the level 3 and/or level 4 domain may be compared and analyzed. That is, the MES and ERP data related to the current time point are displayed on the cell 2 830-2 and cell 4 830-4, while the streaming video data and image of the facility operating system at the current time point are displayed on the cell 1 830-1 and cell 3 830-3. This allows the user to compare the current production quantity against the target production quantity on the same screen. In this connection, a comparison analysis module may be installed separately. Each data is matched with a corresponding item. Based on the current performance against the target performance, an arithmetic calculation of the current production efficiency may be made. That is, it may be assumed that a performance of 600 for the first facility is planned by the MES or ERP. When the current performance of the first facility in the facility operating system is 450, the current production efficiency may be automatically calculated as a yield of 450/600*100%=75%.

Figure 9:
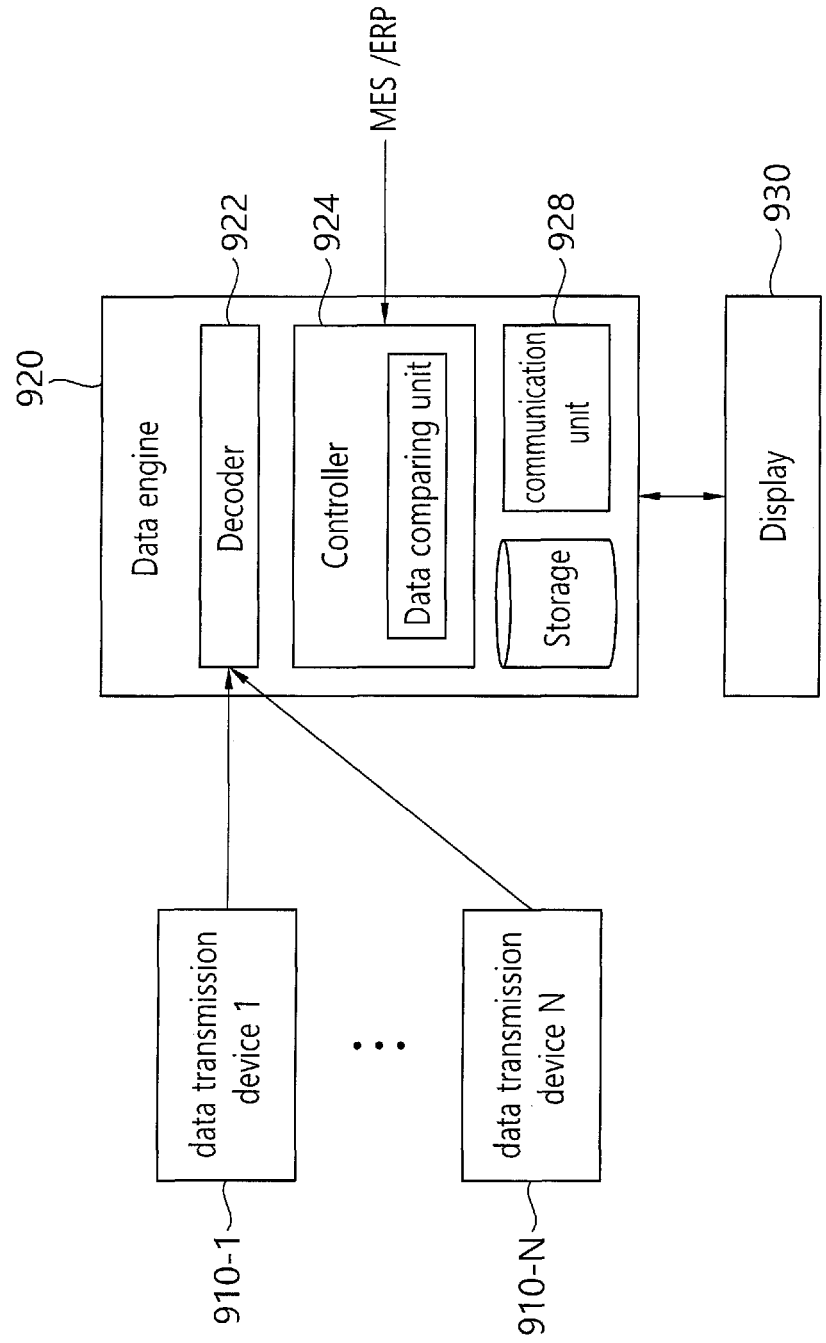
FIG. 9 shows a detailed block diagram of a data engine that receives and displays data from a data transmission device according to one embodiment of the present disclosure.

FIG. 9 is a detailed block diagram of a data engine that receives and displays data from a data transmission device according to one embodiment of the present disclosure. As shown in FIG. 9, a data engine 1020 according to one embodiment of the present disclosure may include a decoder 922, a controller 924, a transmitting unit 926, and a local storage 928. Each component may be implemented by a hardware processor executing instructions associated with the functionality of each component. Alternatively, the component may be implemented by a plurality of hardware processors associated with the function or the combined functions. The data engine 920 may also be referred to as a data receiving unit.

Referring to FIG. 9, the decoder 922 receives, from at least one data transmission device 910-1 to 910-N the encoded video stream (the display screen data, shop floor image data and/or numeric value/text data). Actually, there may be a receiver (not shown) for receiving the data separately. The receiver may include a communications processor. The receiver may receive the encoded video stream from the at least one data transmission device 910-1 to 910-N and may receive the production order data of the level 3 and/or level 4 domain from an external terminal through the communication network.

The decoder 922 decodes the encoded video stream and site image data among the received data. The decoding may be performed in a scheme corresponding to the encoding scheme. The decoder 922 may decode the encoded video stream into YUV format data. In this connection, the YUV data may be YUV 420 data. Then, the decoder converts the decoded YUV data into RGB data. The decoder 922 mixes the converted RGB data so that the converted RGB data can be transmitted through a digital interface such as HDMI/DVI. The mixed data is provided to a display 930. A user of the data engine 920 can view the screen of the facility operating system at the remote location on the display 930.

In this connection, the user of the data engine 920 may enter the control instruction via the user interface (not shown). The user interface (not shown) may be a touch screen, a keyboard and/or a mouse, and the control instruction may be entered via a touch of a touch screen, key input onto a keyboard and/or wheeling movement of a mouse or a mouse click input. The control instruction may be provided to the data transmission device 910 via the transmitting unit 926 and then the data transmission device 910 may provide the control instruction to the facility operating system.

The controller 924 receives the decoded video data from the decoder 922. Further, numeric value/text data (including data extracted from the video data analyzer of the data transmission device) that does not require decoding may be received by the controller. Then, based on the output related signal as input from the user via the user interface, the controller positions and displays the video data on the display 930. The controller 924 processes the received video data and other data and controls each component (e.g., the transmitting unit 926 and the storage 928). Further, a data comparing unit of the controller 924 may generate various structured/non-structured data representing the state of each facility based on the received numeric value/text data. In this connection, the data comparison unit may also generate tables, graphs, and/or charts that indicate state changes over time in the facility. Further, the comparison unit may be configured to compare and analyze the table, graph, and/or chart with table-based data generated based on data (production order data) of the domain 3 and domain 4, such as MES and/or ERP. The comparison unit extracts the same item or an item to be compared from the table-based data and from data of the domain 3 and domain 4, and maps data corresponding to the item. Then, based on the mapped data, the current production efficiency and the possibility of achieving the goal may be analyzed and displayed. Further, the controller sets a threshold value. When a numeric value lower than the threshold value is detected, the controller generates a signal related to the occurrence of a warning to a facility that is determined to have a problem in production efficiency. The generated signal may be transmitted as an alert signal via the transmitting unit 926. Further, at least a portion of the comparison and analysis results from the data comparing unit may be transmitted to the data transmission device 910-1 to 910-N corresponding to each facility via the transmitting unit 926.

The controller 924 generates a signal associated with an output condition associated with the output of video data and other data from the display 930 and transmits the signal to the data transmission device 910-1 to 910-N via the transmitting unit 926. Further, the data engine 920 receives video data and other data from a plurality of data transmission devices 910-1 to 910-N. Thus, the controller identifies which data transmission device 910-1 to 910-N transmits the data being presented. The controller sends the output condition information to the identified data transmission device (e.g., device 910-N).

Further, when the controller 924 receives video data and data that are not currently being output, the controller stores the received data together with the time information in the local storage 928. Later, when loading of video data, numeric value/text and structured/non-structured data at a specific time point in the past is required, the controller may also be configured to fetch and display the video data, numeric value/text and structured/non-structured data at the particular time point.

Figure 10:
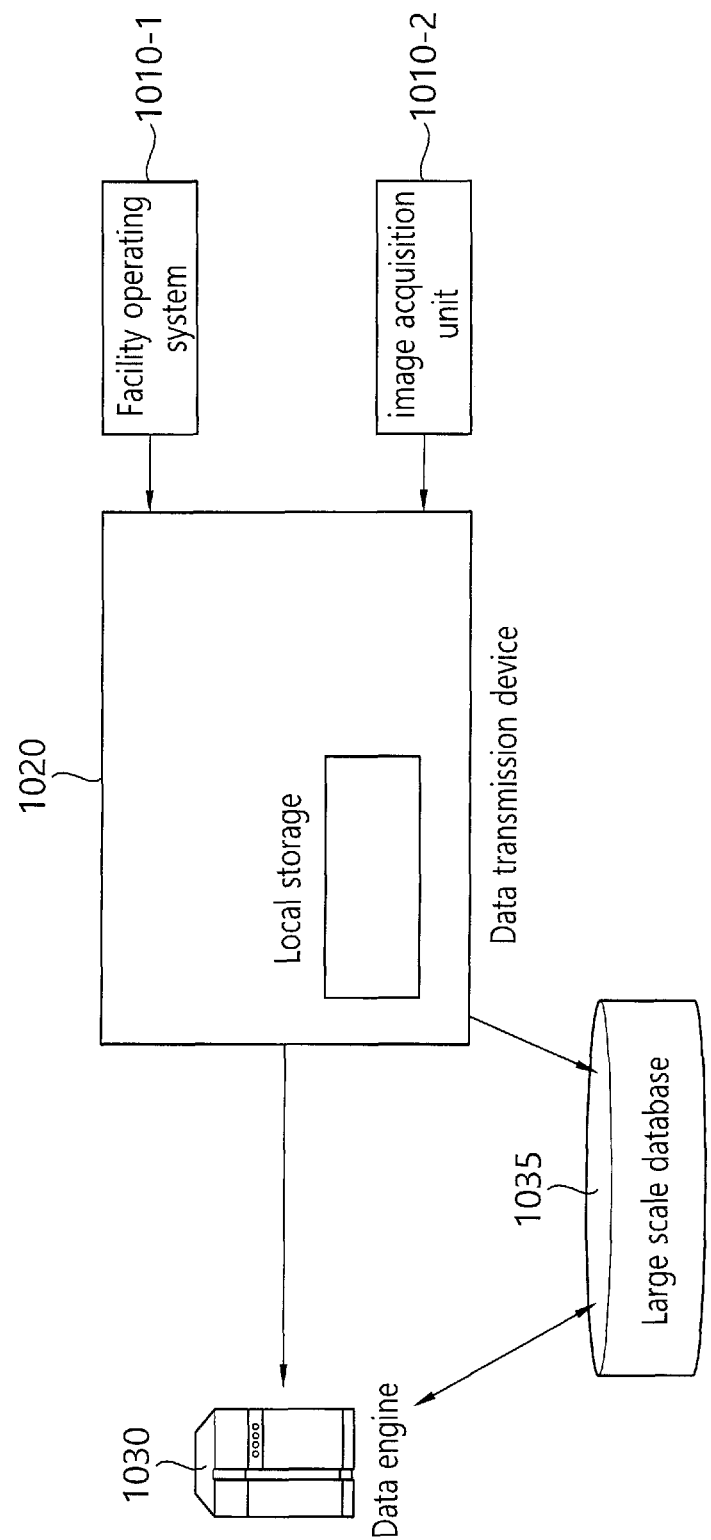
FIG. 10 is a schematic representation of a system for data transmission device-based dual-recording according to another embodiment of the present disclosure.

FIG. 10 is a schematic representation of a system for data transmission device-based dual-recording according to another embodiment of the present disclosure. As shown in FIG. 10, a system for data transmission device-based dual-recording according to one embodiment of the present disclosure includes a facility operating system 1010-1, an image acquisition unit 1010-2, a data transmission device 1020, and data engine 1030.

Referring to FIG. 10, a data transmission device 1020 relays data received from video data providing devices 1010-1 to 1010-2 to the data engine 1030. The data engine 1030 may be configured to perform real-time recording or screen output. The data transmission device 1020 may receive moving image data in real time. The device may provide the received moving video data to the data engine 1030. The device 1020 periodically receives a report related to reception from the data engine 1030 and may check whether there is any abnormality in terms of the reception of the data. Then, in a non-receivable state, the device 1020 detects an non-receivable point, and records data from the detected point. This may eliminate the recording or reception interruption due to the recovery delay time.

The data transmission device 1020 may be requested of the relay of remote moving image data from the data engine 1030 and perform the relay operation. The data transmission device 1020 receives moving image data from the video data providing devices 1010-1 to 1010-2. The device 1020 may buffer the received moving image data into a queue within a certain amount of time (e.g., at least 15 seconds for failure recovery time). The data transmission device 1020 may then relay the moving image data stream and/or other data to the data engine 1030 along with the buffering.

According to one embodiment of the present disclosure, the data transmission device 1020 has a recording function and a communication/relay function. The device may include a VCR (Video Cassette Recorder), a DVR (Digital Video Recorder), a PVR (Personal Video Recorder), or a PC, a personal digital assistant (PDA), a smart phone, a laptop, Consumer Electronics (CE), Wireless Home Appliances, Internet Home Appliances, Set Top Boxes, etc.

The data engine 1030 may record a moving image data stream received from the data transmission device 1020. The data engine 1030 generates a state report message including information on whether or not the current recording is possible and/or whether normal recording is possible, according to a specific period. The status report message may then be transmitted to the data transmission device 1020. When the data engine 1030 is in a non-recordable state (for example, due to network failure or recording failure), the data transmission device 1020 may detect that there is no state report for a predetermined period of time and may detect the recording disabled state. In this connection, the data transmission device 1020 may locate a discontinued portion of the queue from a non-response time point and then continue the recording.

The data engine 1030 is directly connected to the data transmission device 1020 and has a recording function. The data engine 1030 may include VCRs, DVRs, PVRs, and various computing devices and/or terminals, like the data transmission device 1020. The data engine 1030 may be associated with large database 1035. The data engine may store the data received from the data transmission device 1020 into the large capacity database 1035.

According to an embodiment of the present disclosure, the data transmission device 1020 and data engine 1030 may share a common database 1035 and record a moving image data stream in the database. In this connection, the data transmission device 1020 finds a time point at which recording by the data engine 1030 has ceased, based on the moving image data stream already recorded in the common database 1035. Then, the device 1020 may write data to the shared database 1035 with starting at a point in the buffered moving image data stream of the interrupted queue corresponding to the found time point. Thus, seamless recorded video data may be recorded into the database without any additional operation.

According to one embodiment of the present disclosure, seamless recording may be possible even in the case of the data engine 1030 recording failure. In the case of the recorded content without conversion of the original moving image data, the data engine may be implemented using only a low performance device (e.g., desktop device).

Figure 11:
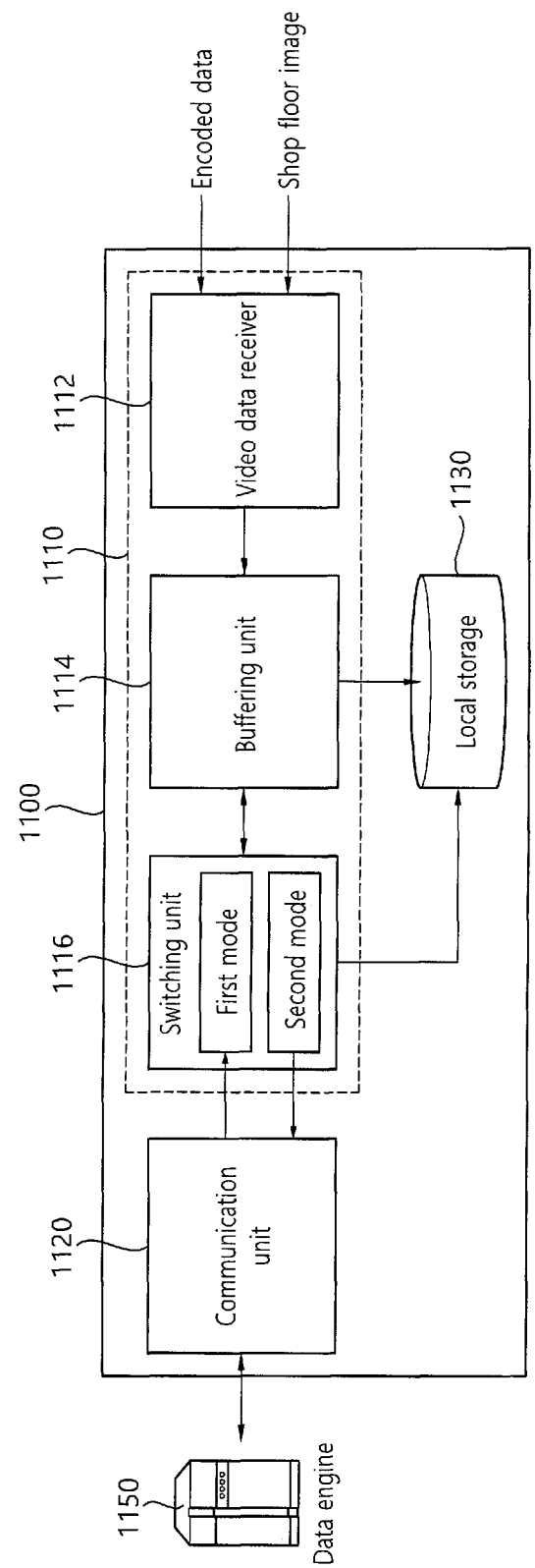
FIG. 11 shows a detailed block diagram of a data transmission device that performs dual-recording according to another embodiment of the present disclosure.

FIG. 11 is a detailed block diagram specifically illustrating a configuration of a data transmission device that performs dual-recording according to another embodiment of the present disclosure. As shown in FIG. 11, the data transmission device may include a controller 1110, a communication unit 1120, and a local storage 1130.

Further, the controller 1110 includes a video data distribution unit, and may further include a video data receiver 1112, a buffering unit 1114, and a switching unit 1116. Each of the above components may be implemented as one hardware processor or a plurality of hardware processors. A plurality of components may be implemented to be distributed among a plurality of processors. Further, the processor may perform a function based on an instruction from a memory (not shown) that includes instructions for performing the function of the component.

Referring to FIG. 11, the video data receiver 1112 may receive a moving image data stream from video data providing devices. The video data receiver 1112 receives the streaming video data of the facility operating system and other shop floor image streams as encoded by the encoder in real time. The video data receiver 1112 may include an antenna and/or communication processor. The video data receiver 1112 may receive a moving image data stream in real time. The receiver 1112 may receive a plurality of moving image data streams multiplexed through a plurality of channels.

The buffering unit 1114 may temporarily store the moving image data stream received from the video data receiver 1112 in an at least one queue. A maximum buffering time may be set for the buffering unit 1114. The maximum buffering time may be set to a default value. Alternatively, the maximum buffering time may be set directly by the user via a user interface (not shown). The maximum buffering time may vary during recording or relaying operations. However, the maximum buffering time is preferably longer than the state reporting period from data engine 1150. The buffering unit 1114 may initially store a specific portion or specific frame of the moving image data stream as buffered in the queue into the local storage 1130 according to the control signal of the switching unit 1116.

The switching unit 1116 may receive a moving image data stream from the buffering unit 1114 and/or the video data receiver 1112 and provide the received stream to the communication unit 1120 or local storage 1130. The mode in which the stream is provided to the communication unit 1120 may be referred to as a first mode or a relay mode. The mode in which the stream is provided to the local storage 1130 may be referred to as a second mode or a recording mode. In some cases, relay and recording may be performed simultaneously. However, in another embodiment of the present disclosure, it may be assumed that one mode is selected and applied.

The switching unit 1116 may be configured to operate in the first mode by default. According to the first mode, normal recording by the data engine 1150 is assumed. The moving image data stream received via the buffering unit 1114 and/or video data receiver 1112 is relayed to the data engine 1150.

The switching unit 1116 determines whether normal recording operation of the data engine 1150 is performed, based on a state report message from the data engine 1150 provided by the communication unit 1120. Thus, information may be obtained as to whether or not normal recording is currently being performed. For example, when a recording failure situation in which normal recording is not performed is detected, the switching unit 1116 may switch the operating mode from first mode to the second mode. With respect to detection of the recording error condition, the switching unit 1116 compares the state report time received from the data engine 1150 with a preset threshold time. If a state report is not received during a time greater than the threshold time, the switching unit may determine that a recording failure situation has occurred. In this connection, the threshold time may be set to the maximum buffering time. Alternatively, the switching unit 1116 may determine occurrence of the recording disabled condition according to a threshold condition. The threshold condition may include the following conditions: a condition that the delay time of the state report (for example, the time from the most recent state report time point to the current time point where no state report is received) is larger than the average reception time value of the state report; and/or a condition that the state report delay time is larger than half of the set maximum buffering time. When the threshold condition is satisfied, the switching unit determines that the connection with the data engine 1150 is released or that the data engine 1150 is unable to record. Thus, the switching unit switches the first mode to the second mode in which the data transmission device 1100 directly records the moving image data stream. According to the second mode, the switching unit 1116 allows the moving image data stream to be stored directly in the local storage 1130. The switching unit 1116 receives the stream buffered by the buffering unit 1114 and provides the stream to the local storage 1130. Alternatively, the switching unit may provide an indication to the buffering unit 1114 to allow the buffering unit 1114 to directly store the moving image data stream in the local storage 1130. In this connection, the switching unit assumes that the data engine 1150 has not recorded a moving image data stream since the non-response time point. The switching unit may find the non-response time point and store the moving image data stored in the queue of the buffering unit 1114 into the local storage 1130 from the non-response time point.

Further, when the switching unit 1116 determines that the report is resumed from the data engine 1150, the switching unit 1116 switches the second mode to the first mode at a time point at which the state report is received again. In the first mode, the data engine 1150 records a moving image data stream, and the switching unit may serve as a repeater.

The communication unit 1120 provides a connection with the data engine 1150. The communication unit may be connected to a wired or wireless network. The communication unit 1120 may be embodied as a modem, an antenna, a communication modem and/or a communication processor, and the like. Thus, the communication unit can communicate various information including the moving image data stream with the data engine 1150. The communication unit 1120 may forward the moving image data stream to the data engine 1150 when the switching unit 1116 is in the first mode. The communication unit 1120 may periodically receive a state report from the data engine 1150. Then, the communication unit may provide the status report to the switching unit 1116.

When the local storage 1130 is in the second mode, the communication unit may receive the buffered moving image data stream from the switching unit 1116 or buffering unit 1114 and store the stream in its own memory and/or database (not shown). The self-contained memory may be a hard disk, a flash disk, a RAM/ROM, etc., resident in the data transmission device 1100.

Figure 12:
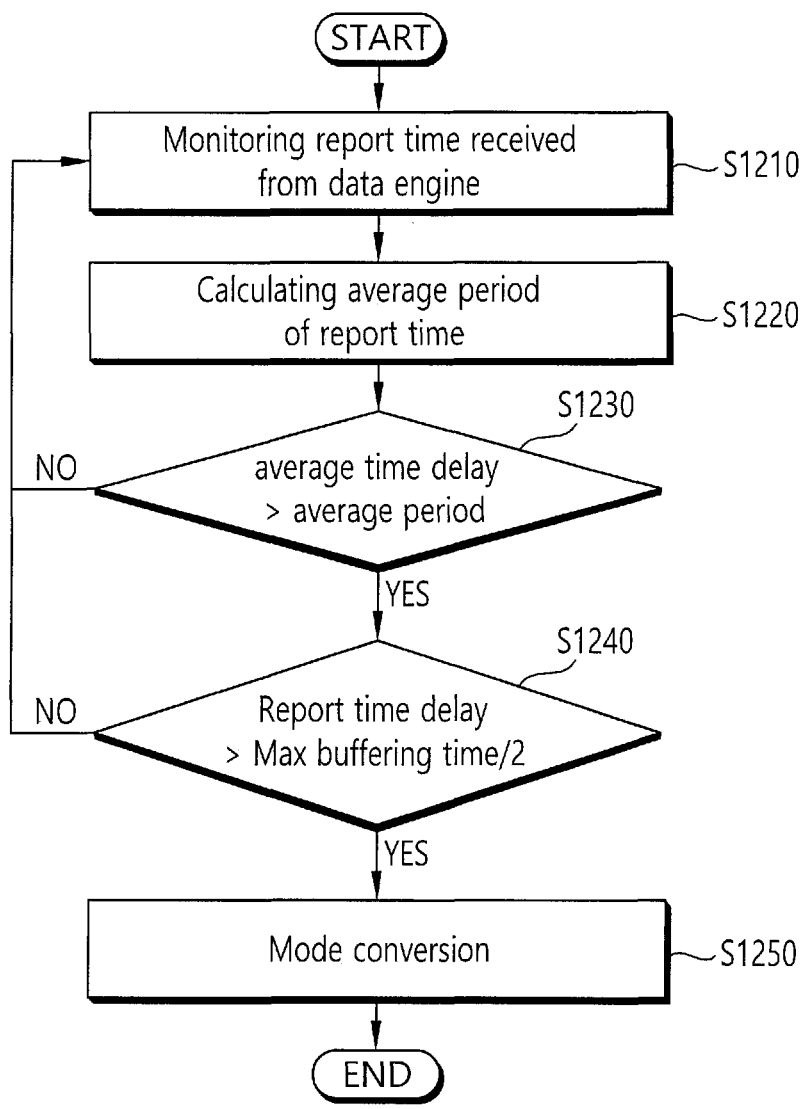
FIG. 12 is a flowchart showing the fault determination method by the switching unit of FIG. 11.

FIG. 12 is a flow chart showing a fault detection method by the switching unit of FIG. 11.

Referring to FIG. 12, the switching unit of the data transmission device may receive a state report message from the data engine via the communication unit and monitor the message S1210.

Subsequently, the switching unit may record the reception time information of the state report message as received from the data engine by a predetermined capacity. Subsequently, the switching unit may calculate an average period of the report based on the information S1220.

The switching unit may determine whether a fault has occurred using a following switching condition or threshold condition based on the result of the state report message monitoring and the report message average period information.

-Switching condition
R$_t$=state report reception time received from data engine
B$_m$=set maximum buffering time
V$_t$=average period of R$_t$
T$_n$=delay time of measured R$_t$
when (i) V$_t$<T$_n$ & (ii) T$_n$>(B$_m$/2), switching is performed.

According to the switching condition, the switching unit measures the delay time T$_n$ based on the state report reception time. Then, the switching unit determines whether the measured delay time is greater than the average period V$_t$ S1230. Alternatively or additionally, if the measured delay time Tn is greater than half the maximum buffering time B$_m$, the switching unit may determine that a recording error state has occurred S1240. In this connection, the delay time may be calculated based on the non-response time point. Further, the switching condition does not have to be based on the half of the maximum buffering time B$_m$. The switching condition may be based on a time condition arbitrarily set by a user, a maximum buffering time B$_m$ itself, and/or a new reference time obtained by subtracting a certain time from the maximum buffering time B$_m$. These times and conditions may be arbitrarily set by the user via the user interface.

In this connection, the switching unit may detect a fault and provide a control signal indicating the mode change. Further, at the same time, the switching unit detects a non-response time point (e.g., the latest state report signal reception time). The switching unit may provide the buffering unit with a control signal indicating to allow the buffering unit to store the buffered moving image data stream from the detected time point.

Further, in a state switched to the second mode, that is, in a state where a fault is occurring, the switching unit may recognize the time point at which the state report is resumed based on the state report reception time point. In this connection, the switching unit may generate a control signal indicating that the mode is changed from the second mode to the first mode.

As described above, in the first mode, the switching unit transmits the buffered moving image data stream to the data engine via the communication unit. In the second mode, on the other hand, the switching unit transmits the buffered moving image data stream to the local storage. When a switching indication control signal is received, the operating mode may be switched such that the first mode may be switched to the second mode, or the second mode may be switched to the first mode.

According to another embodiment of the present disclosure, when the device transmits screen data (e.g., streaming video data or shop floor image data) of the level 1 and level 2 operating-system systems such as SCADA and HMI to the data engine, the device may also consider network usage bandwidth. For example, when there is no change in the screen to be transmitted, the screen transmission frame may be minimized. When an alarm occurs or information tagged on the screen to be collected changes, the frame may be temporarily increased. This transmission scheme is merely an example. According to an embodiment of the present disclosure, when a change in the tagged portion and in the video data in the specific region in the screen is detected via the video data analysis, the change in the frame rate may be triggered.

To this end, according to an embodiment of the present disclosure, the device monitors changes over a predetermined period of time (window period). When the change is completed, the device may be switched to a transmission scheme to transmit using the minimum frame again. A minimum frame of 3 fps to 5 fps may be appropriate. In this case, a plurality of alarm situations may be set. The frame transmission may be controlled more efficiently based on the policy adapted for a plurality of distinct alarm situations. For example, when the numeric value change is a change at a value of 10 within the set window period, the alarm 1 situation is set. When the numeric value change is a change at a value of 20 within the set window period, the alarm 2 situation is seta A scheme for converting the change of the frame to the first frame rate or the second frame rate in response to the alarm 1 situation or the alarm 2 situation during the occurrence of the alarm condition is monitored may be employed. This operation may be performed by the video data analyzer.

In addition, according to another embodiment of the present disclosure, when a change occurs in the site operating-system screen, the device may capture the screen to store generated data and upload the captured image to a cloud drive (e.g., a Google Drive, drop box, etc.) in an image file format. In this connection, to reduce the network bandwidth used when uploading all the changed images at the same time, a first captured video data may be uploaded in a full image format, and, thereafter, when a change occurs, the image of the changed portion is cropped into a certain region. Then, the device may rename and upload the cropped image as a minimized image to the cloud drive. This can maximize network efficiency.

According to the device and method for extracting and transmitting data from a shop floor image according to the present disclosure, it may be easy to integrate data currently being monitored for each facility as managed by the facility operating system, and production planning and management system related data.

Although the present invention has been described with reference to the drawings and embodiments, it is not intended that the scope of protection of the present disclosure be limited by the drawings or embodiments. It will be understood by those skilled in the art that various changes in form and details may be made thereto without departing from the spirit and scope of the present disclosure set forth in the following claims.

What is claimed is:
1. A device for extracting and transmitting data from a shop floor image, the device comprising:
an encoder configured for receiving, from a facility operating system, streaming video data of a display screen of the facility operating system on a shop floor, and for encoding the streaming video data in real time;
a video data analyzer configured for receiving the real-time encoded streaming video data and for extracting data by figuring out and tagging a data presentation location in the real-time encoded streaming video data using a video data analysis algorithm; and
a communication unit configured for transmitting to a data engine the real-time encoded streaming video data, and the data extracted by the video data analyzer,
wherein the video data analyzer is configured to figure out and tag the data presentation location using the video data analysis algorithm to extract numeric value data and text data from the real-time encoded streaming video data,
wherein the device further comprises a controller configured to control the video data analyzer and the video data distribution unit, wherein the controller is configured to control the video data distribution unit to relay at least a portion of the real-time encoded streaming video data, the extracted data, and the shop floor image data to the data engine while recording the at least a portion into a queue, wherein the controller includes a switching unit configured for switching an operation mode between a relay operation mode and a recording operation mode based on a state report periodically received from the data engine, wherein (i) in the relay operation mode, the real-time encoded streaming video data, the extracted data, and the shop floor image data are relayed to the data engine, wherein (ii) in the recording operation mode, the real-time encoded streaming video data, the extracted data and the shop floor image data is recorded into a local storage.

2. The device of claim 1, wherein the facility operating system comprises a system based on at least one of a sensing/control level, a Programmable Logic Controller (PLC), and a Supervisory Control and Data Acquisition (SCADA) in a production automation process.

3. The device of claim 1, wherein the extracted numeric value data and text data are processed by the data engine into table-based data representing a state change of a facility managed by the facility operating system.

4. The device of claim 1, wherein the device further comprises a video data distribution unit configured to receive the real-time encoded streaming video data, and shop floor image data imaged by a first image acquisition unit of the facility operating system.

5. The device of claim 4, wherein the device is configured to synchronize the streaming video data encoded in the real time, the extracted data, and the shop floor image data based on time information, and to store the synchronized data in a local storage or transmit the synchronized data in real time to the data engine.

6. The device of claim 4, wherein the video data distribution unit is configured: to acquire video data output condition information related to outputting of the real-time encoded streaming video data and the shop floor image data; to adjust resolutions of the real-time encoded streaming video data and the shop floor image data based on the acquired video data output condition information; and to transmit to the data engine the real-time encoded streaming video data and the shop floor image data at the adjusted resolutions.

7. The device of claim 6, wherein the video data distribution unit is configured to determine the resolutions of the real-time encoded streaming video data and the shop floor image data such that data transmission bandwidth used to transmit the data to the data engine is minimized while a first reference resolution of the real-time encoded streaming video data and a second reference resolution of the shop floor image data obtained from the first image acquisition unit are maintained in accordance with the video data output condition information.

8. The device of claim 1, wherein the switching unit is configured to switch the operation mode such that the real-time encoded streaming video data, the extracted data and the shop floor image data buffered into the queue is recorded in the local storage from a time point at which the state report is not received from the data engine.

9. The device of claim 8, wherein the switching unit is configured: to periodically receives a state report from the data engine; to measure a report time from the data engine and calculate an average report reception time; to compare the reception time of the state report from the data engine with a threshold time, and to determines, based on the comparison result, whether a recording error has occurred; and to perform switching between the relay operation mode and the recording operation mode based on a result of the determination, wherein the determination of the occurrence of the recording error is performed based on a report delay time calculated with considering at least one of the measured average report reception time and a maximum buffering time.

10. The device of claim 1, wherein the facility operating system is a based on a first network, wherein the data engine is based on a second network.

11. The device of claim 1, wherein the video data analyzer is configured to determine a video data transmission frame rate based on information associated with a change in a window period between real-time encoded first streaming video data and second streaming video data subsequent to the first streaming video data.

12. A method for extracting and transmitting data from a shop floor image, the method comprising:

receiving, from a facility operating system, streaming video data of a display screen of the facility operating system on a shop floor, and encoding the streaming video data in real time;

receiving the real-time encoded streaming video data and extracting data by figuring out and tagging a data presentation location in the real-time encoded streaming video data using a video data analysis algorithm; and transmitting to a data engine the real-time encoded streaming video data, and the data extracted by using the video data analysis algorithm, wherein the extracting data comprises figuring out and tagging the data presentation location using the video data analysis algorithm to extract numeric value data and text data from the real-time encoded streaming video data, wherein the method further comprises relaying at least a portion of the real-time encoded streaming video data, the extracted data, and the shop floor image data to the data engine while recording the at least a portion into a queue, switching an operation mode between a relay operation mode and a recording operation mode based on a state report periodically received from the data engine, wherein (i) in the relay operation mode, the real-time encoded streaming video data, the extracted data, and the shop floor image data are relayed to the data engine, wherein (ii) in the recording operation mode, the real-time encoded streaming video data, the extracted data and the shop floor image data is recorded into a local storage.

13. A device for receiving data extracted from a shop floor image, the device comprising:

a receiver configured to receive, from a first terminal, real-time encoded streaming video data, and data extracted from the streaming video data, wherein the real-time encoded streaming video data is generated by real-time encoding streaming video data of a display screen of a monitor of the facility operating system on a shop floor;

a decoder configured to decode the received streaming video data and extracted data; and a local storage configured to synchronize the decoded streaming video data and extracted data based on time information and store therein the synchronized data, wherein the extracted data is processed by figuring out and tagging the data presentation location using the video data analysis algorithm to extract numeric value data and text data from the real-time encoded streaming video data, wherein at least a portion of the real-time encoded streaming video data, the extracted data, and the shop floor image data is relayed from the first terminal while recording the at least a portion into a queue, switching an operation mode between a relay operation mode and a recording operation mode based on a periodic state report, wherein (i) in the relay operation mode, the real-time encoded streaming video data, the extracted data, and the shop floor image data are relayed from the first terminal, wherein (ii) in the recording operation mode, the real-time encoded streaming video data, the extracted data and the shop floor image data is recorded into the local storage.

14. The device of claim 13, wherein the streaming video data is based on at least one of a sensing/control level, a Programmable Logic Controller (PLC), and a Supervisory Control and Data Acquisition (SCADA) in a production automation process.

15. The device of claim 14, wherein the receiver is configured to receive from a second terminal, via a network, production order data associated with at least one of a manufacturing execution domain of a production automation process and a business domain associated with an enterprise resource planning, wherein the device further includes a data comparison unit configured for comparing the extracted data with the production order data.

16. The device of claim 15, wherein the production order data includes at least one of Manufacturing Execution System (MES) data and Enterprise Resource Planning (ERP) data.

17. A method for receiving data extracted from a shop floor image, the method comprising:

receiving, from a first terminal, real-time encoded streaming video data, and data extracted from the streaming video data, wherein the real-time encoded streaming video data is generated by real-time encoding streaming video data of a display screen of the facility operating system on a shop floor;

decoding the received streaming video data and extracted data; and synchronizing the decoded streaming video data and extracted data based on time information and storing the synchronized data, wherein the extracted data is processed by figuring out and tagging the data presentation location using the video data analysis algorithm to extract numeric value data and text data from the real-time encoded streaming video data, wherein at least a portion of the real-time encoded streaming video data, the extracted data, and the shop floor image data is relayed from the first terminal while recording the at least a portion into a queue, switching an operation mode between a relay operation mode and a recording operation mode based on a periodic state report, wherein (i) in the relay operation mode, the real-time encoded streaming video data, the extracted data, and the shop floor image data are relayed from the first terminal, wherein (ii) in the recording operation mode, the real-time encoded streaming video data, the extracted data and the shop floor image data is recorded into the local storage.

18. A system for transmitting and receiving data extracted from a shop floor image, the system comprising:

a data transmission device configured:

for receiving, from a facility operating system, streaming video data of a display screen of the facility operating system on a shop floor, and for encoding the streaming video data in real time;

for receiving the real-time encoded streaming video data and for extracting data by figuring out and tagging a data presentation location in the real-time encoded streaming video data using a video data analysis algorithm; and transmitting to a data engine the real-time encoded streaming video data, and the data extracted by the video data analysis algorithm; and a data engine configured:

for receiving the real-time encoded streaming video data, and the extracted data from the data transmission device;

for decoding the received streaming video data and extracted data; and for synchronizing the decoded streaming video data and extracted data based on time information and storing the synchronized data, wherein the data transmission device is configured to figure out and tag the data presentation location using the video data analysis algorithm to extract numeric value data and text data from the real-time encoded streaming video data, wherein the data transmission device relays at least a portion of the real-time encoded streaming video data, the extracted data, and the shop floor image data to the data engine while recording the at least a portion into a queue, wherein the data transmission device switches an operation mode between a relay operation mode and a recording operation mode based on a state report periodically received from the data engine, wherein (i) in the relay operation mode, the real-time encoded streaming video data, the extracted data, and the shop floor image data are relayed to the data engine, wherein (ii) in the recording operation mode, the real-time encoded streaming video data, the extracted data and the shop floor image data is recorded into a local storage.

* * * * *